US009404765B2

(12) United States Patent
Jiyama et al.

(10) Patent No.: US 9,404,765 B2
(45) Date of Patent: Aug. 2, 2016

(54) ON-VEHICLE DISPLAY APPARATUS

(71) Applicant: FUJITSU TEN LIMITED, Kobe-shi, Hyogo (JP)

(72) Inventors: Motoya Jiyama, Kobe (JP); Tomohisa Koseki, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

(21) Appl. No.: 14/605,461

(22) Filed: Jan. 26, 2015

(65) Prior Publication Data

US 2015/0211878 A1   Jul. 30, 2015

(30) Foreign Application Priority Data

Jan. 30, 2014 (JP) .................................. 2014-015569
Feb. 28, 2014 (JP) .................................. 2014-038047

(51) Int. Cl.
*G01C 21/00* (2006.01)
*G01C 21/36* (2006.01)

(52) U.S. Cl.
CPC .......... *G01C 21/365* (2013.01); *G01C 21/3629* (2013.01); *G01C 21/3632* (2013.01)

(58) Field of Classification Search
CPC .. G01C 21/365; G01C 21/3629; G01C 21/00; G01C 21/367
USPC ......... 701/439, 400, 408–412, 419, 426–428, 701/441; 345/132, 165, 156, 162, 173, 544
See application file for complete search history.

(56) References Cited

U.S. PATENT DOCUMENTS

| 8,681,181 B2* | 3/2014 | Arrasvuori | G06T 3/0025 345/660 |
| 2012/0050139 A1* | 3/2012 | Wang | G02B 27/01 345/7 |
| 2013/0204629 A1* | 8/2013 | Nakanishi | G06F 3/01 704/275 |
| 2014/0188388 A1* | 7/2014 | Malahy | G01C 21/367 701/533 |
| 2015/0015479 A1* | 1/2015 | Cho | G06F 3/013 345/156 |

FOREIGN PATENT DOCUMENTS

| JP | A-2006-220447 | 8/2006 |
| JP | A-2013-203374 | 10/2013 |

* cited by examiner

*Primary Examiner* — Dalena Tran
(74) *Attorney, Agent, or Firm* — Oliff PLC

(57) ABSTRACT

An on-vehicle display apparatus includes a controller configured to acquire a first display image to be displayed on a display of a navigation apparatus, extract a portion of the first display image based on a layout information relevant to a layout of the first display image, and generate a second display image by use of the extracted part of the image, and displays on a head-up display the second display image generated by the controller. The display apparatus displays on the head-up display a guide image generated by the controller. It is possible to display an image of the navigation apparatus on the head-up display, without a connection between the navigation apparatus and the display apparatus.

17 Claims, 23 Drawing Sheets

| No | DISPLAY MODE | TIME | VELOCITY | DISPLAY PATTERN |
|---|---|---|---|---|
| 1 | ORDINARY ROAD | DAY | HIGH | NAVI-IMAGE (COORDINATE A1, COORDINATE A2)<br>→ HUD (COORDINATE H1, COORDINATE H2), LUMINANCE 70% |
| 2 | ORDINARY ROAD | DAY | MEDIUM | NAVI-IMAGE (COORDINATE A1, COORDINATE A2)<br>→ HUD (COORDINATE H1, COORDINATE H2), LUMINANCE 70% |
| 3 | ORDINARY ROAD | DAY | LOW | NAVI-IMAGE (COORDINATE A1, COORDINATE A2, COORDINATE A3)<br>→ HUD (COORDINATE H1, COORDINATE H2, COORDINATE H3), LUMINANCE 70% |
| 4 | EXPRESS WAY | DAY | HIGH | NAVI-IMAGE (COORDINATE B1, COORDINATE B2)<br>→ HUD (COORDINATE I1, COORDINATE I2), LUMINANCE 70% |
| 5 | EXPRESS WAY | DAY | MEDIUM | NAVI-IMAGE (COORDINATE B1, COORDINATE B2)<br>→ HUD (COORDINATE I1, COORDINATE I2), LUMINANCE 70% |
| 6 | EXPRESS WAY | DAY | LOW | NAVI-IMAGE (COORDINATE B1, COORDINATE B2, COORDINATE B3)<br>→ HUD (COORDINATE I1, COORDINATE I2, COORDINATE I3), LUMINANCE 70% |
| 7 | INTER SECTION | DAY | HIGH | NAVI-IMAGE (COORDINATE C1, COORDINATE C2)<br>→ HUD (COORDINATE J1, COORDINATE J2), LUMINANCE 70% |
| 8 | INTER SECTION | DAY | MEDIUM | NAVI-IMAGE (COORDINATE C1, COORDINATE C2)<br>→ HUD (COORDINATE J1, COORDINATE J2), LUMINANCE 70% |
| 9 | INTER SECTION | DAY | LOW | NAVI-IMAGE (COORDINATE C1, COORDINATE C2, COORDINATE C3)<br>→ HUD (COORDINATE J1, COORDINATE J2, COORDINATE J3), LUMINANCE 70% |
| 10 | ORDINARY ROAD | NIGHT | HIGH | NAVI-IMAGE (COORDINATE A1, COORDINATE A2)<br>→ HUD (COORDINATE H1, COORDINATE H2), LUMINANCE 40% |
| ... | ... | ... | ... | ... |

FIG.3

ON-VEHICLE DISPLAY APPARATUS

BACKGROUND OF THE INVENTION

1. Field of the Invention

The invention relates to a technology of a display apparatus for use in a vehicle.

2. Description of the Background Art

Conventionally, a head-up display that displays information for a user driving a car while remaining looking at the front view is known. The head-up display displays various information transmitted from a navigation apparatus installed in the vehicle, so as to support user's driving.

However, since the head-up display is disposed in the vicinity of user's visual field, the display size is restricted. In addition, the resolution of the head-up display is not as high as the one of a liquid crystal panel. Since it is impossible to display a lot of information on the head-up display, the information displayed on the screen on the navigation apparatus is not available as is for display on the head-up display, and thereby requiring an image processing in accordance with the image generated by the navigation apparatus. Therefore, it is difficult to post-install the head-up display in the vehicle already equipped with a navigation apparatus.

Again, a head-up display that displays information for a user driving a car while remaining looking at the front view is known conventionally. The head-up display displays various information transmitted from a navigation apparatus installed in the vehicle, so as to support user's driving. It is desirable that such head-up displays be widely used because they facilitate safe driving.

However, some navigation apparatuses have no output terminal for outputting information, which is because the connection to external devices is not expected. In this case, it is impossible to transmit the information of the navigation apparatus to the head-up display.

Since the head-up display is disposed in the vicinity of user's visual field, the display size is restricted, and it is impossible to display a lot of information on the head-up display. In some case, the information displayed on the screen on the navigation apparatus is not available as is for display on the head-up display, and thereby requiring an information conversion processing.

As above, it is not easy to post-install a head-up display in the vehicle already equipped with a navigation apparatus, which hinders the spread of the head-up displays that facilitate safe driving.

SUMMARY OF THE INVENTION

According to one aspect of the invention, an on-vehicle display apparatus for use in a vehicle includes a controller configured to acquire a first display image to be displayed on a display screen of a navigation apparatus; extract a portion of the first display image as an extraction image based on a layout information relevant to a layout of the first display image; and generate a second display image by use of the extraction image; and a head-up display that displays the second display image generated by the controller.

Thus, it is possible to display on the head-up display a navigation image for each of various models of navigation apparatuses. Thereby, it is possible to post-install the head-up display in a vehicle already equipped with any model of the navigation apparatuses.

According to another aspect of the invention, an image display system for use in a vehicle includes: a controller configured to acquire a guide sound relevant to a route guidance generated by a navigation apparatus; recognize the guide sound; and generate a guide image relevant to the route guidance based on a recognition result of the recognized guide sound; and a head-up display that displays the guide image generated by the controller.

The sound relevant to the route guidance generated by the navigation apparatus is acquired, and an image showing a content of the acquired sound is displayed on the head-up display. Thus, it is possible to post-install the head-up display even in a vehicle already equipped with the navigation apparatus.

These and other objects, features, aspects and advantages of the invention will become more apparent from the following detailed description of the invention when taken in conjunction with the accompanying drawings.

BRIEF DESCRIPTION OF THE DRAWINGS

FIG. 3 shows an example of display pattern data.

DESCRIPTION OF THE EMBODIMENTS

Hereinafter, some embodiments of the invention are described based on attached drawings.

1. First Embodiment

1-1. Outline

Figure 1:
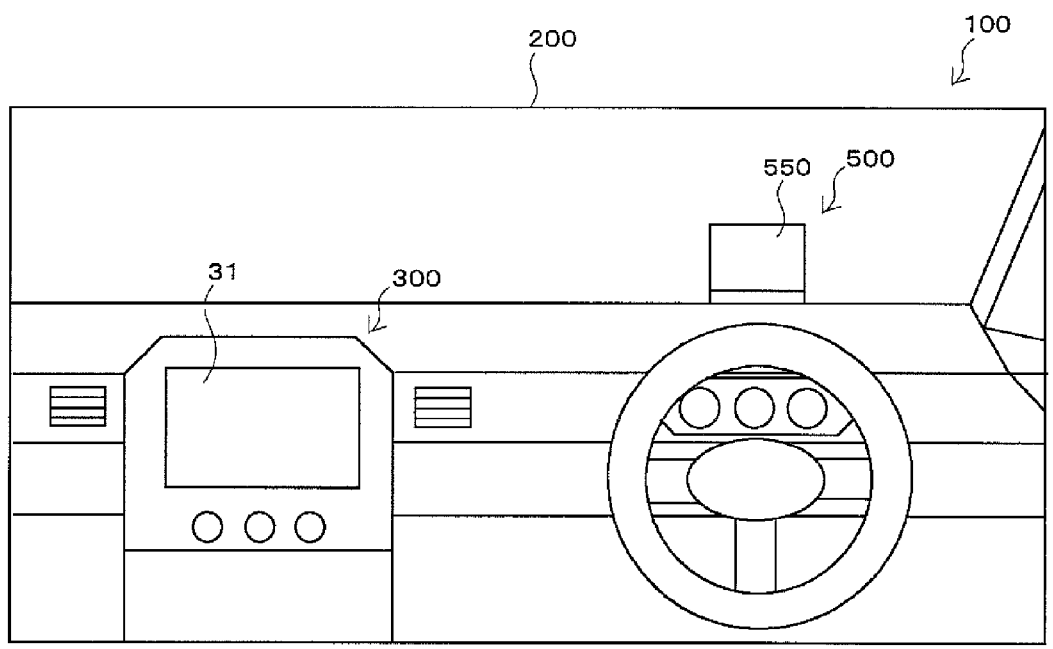
FIG. 1 shows an outline of an image display system of the first embodiment.

FIG. 1 shows an outline of an image display system 100 of the embodiment of the invention. The image display system 100 displays, on a head-up display 550 included in a display apparatus 500, an image generated by a navigation apparatus 300 that is installed in a vehicle 200.

The display apparatus 500 equipped with the head-up display 550 is disposed in the vicinity of the front of the driver seat in the vehicle 200. The display apparatus 500 displays on the head-up display 550 the map or the route guidance information obtained from the navigation apparatus 300 via a connection line to support user's driving. Since the display apparatus 500 is disposed in the vicinity of the front of a user, the display apparatus 500 requires less movement of user's visual line compared to the case where the user looks at a display 31 included in the navigation apparatus 300 that is disposed in the center console. This facilitates safe driving.

However, since the head-up display 550 is disposed in the vicinity of the front of the driver seat, the display size of the head-up display 550 must be small so as not to hinder the front visual field of the user. Thus, it is difficult to display on the head-up display 550 the whole of the image displayed on the display 31 of the navigation apparatus 300. Further, since the head-up display 550 is a transparent glass optical element, the head-up display 550 can hardly provide a fine image, unlike the display 31 that is a liquid crystal display or the like included in the navigation apparatus 300.

Therefore, in order to display on the head-up display 550 the image displayed on the display 31 of the navigation apparatus 300, it is necessary to recreate a new image from the image generated in the navigation apparatus 300 so that the new image fits the size or the display ability of the head-up display 550.

There are various models manufactured by plural makers available as the navigation apparatus 300, differing in image content, layout and size. Therefore, the display apparatus 500 post-installed in the vehicle 200 cannot recreate an image fitting to a model manufactured by a different maker. That is, it is difficult for the display apparatus 500 to display an image on the head-up display 550.

On the image display system 100 of the embodiment of the invention, an image displayed on the display 31 of the navigation apparatus 300 is obtained, and a part of the image is extracted based on layout information relevant to the layout of the image. Then, by use of the extracted part of the image, an image to be displayed on the head-up display 550 is generated. This enables the navigation image to be displayed on the head-up display 550, the navigation image being generated from the image originally for the navigation apparatus 300 that may be one of various models manufactured by plural makers. Therefore, it is possible to easily post-install the head-up display 550 in the vehicle 200 that is already equipped with the navigation apparatus 300.

1-2. Configuration

Figure 2:
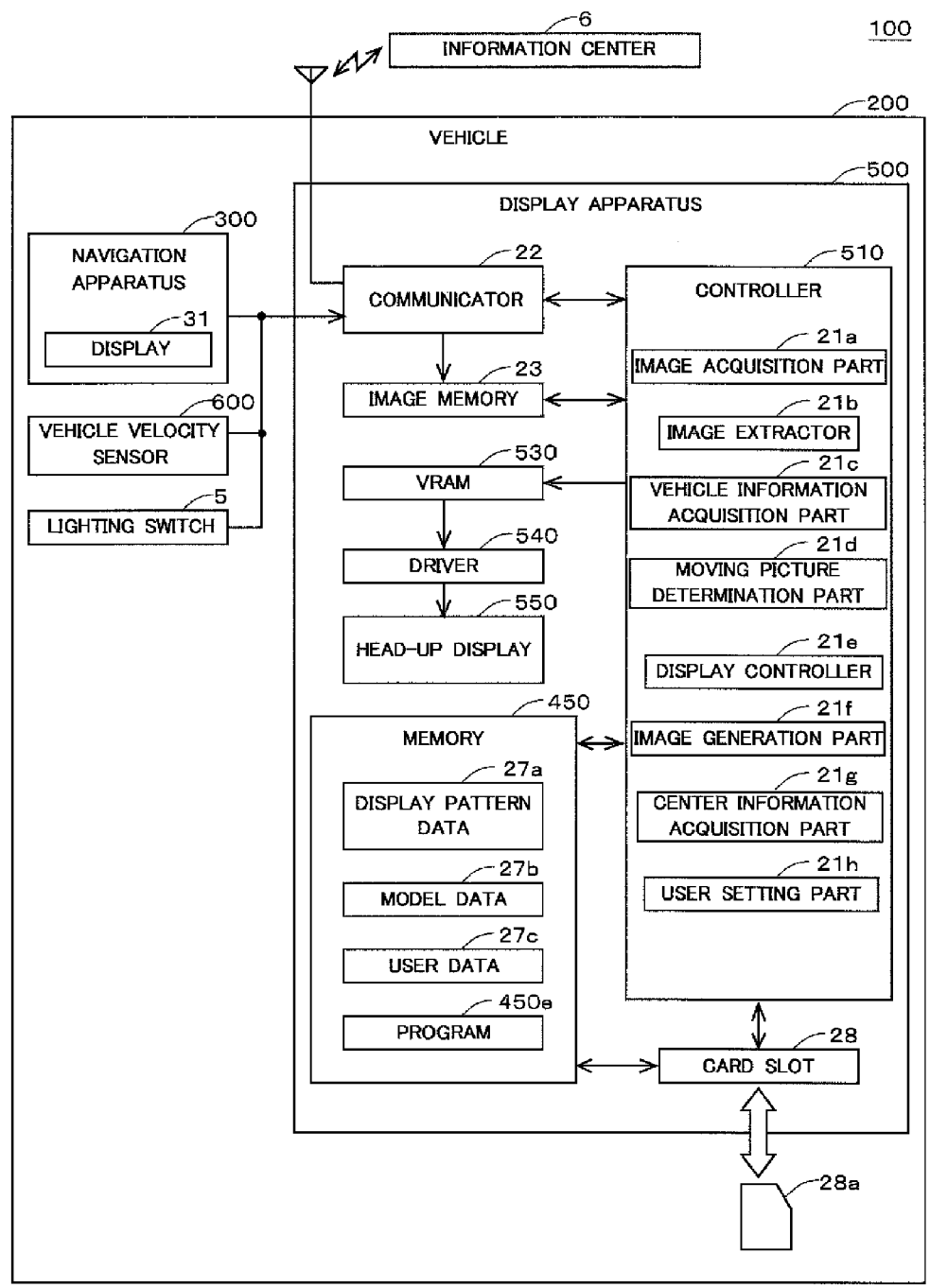
FIG. 2 shows a configuration of the image display system of the first embodiment.

The configuration of the image display system 100 is explained. FIG. 2 shows the configuration of the image display system 100. The image display system 100 includes the display apparatus 500 installed in the vehicle 200, the navigation apparatus 300, a vehicle velocity sensor 600, a lighting switch 5, and an information center 6 established outside the vehicle 200.

The display apparatus 500 equipped with the head-up display is disposed in the vicinity of the front of the driver seat. The display apparatus 500 displays on the head-up display the map or the route guidance information obtained from the navigation apparatus 300 to support user's driving. Since the display apparatus 500 is disposed in the vicinity of the front of a user, looking at the display apparatus 500 requires less movement of user's visual line compared to the case of looking at the navigation apparatus 300 that is disposed in the center console. This facilitates safe driving.

The navigation apparatus 300 generates a map image, route guidance information and others to display on the display. In addition, the navigation apparatus 300 outputs the generated image data to a video output terminal (not shown in the figure) such as an RCA terminal.

The vehicle velocity sensor 600 detects a velocity of the vehicle 200 and transmits the obtained vehicle velocity data to a controller 510 which is detailed later.

The lighting switch 5 functions for turning on and off a headlight or the like included in the vehicle 200. When a user turns on a light by the lighting switch 5, the light not shown in the figure is turned on, and an illumination signal is transmitted from the lighting switch 5 to the controller 510. When the user turns off the light by the lighting switch 5, the light not shown in the figure is turned off, and the transmission of the illumination signal is stopped.

The vehicle velocity data and the illumination signal to be transmitted to the controller 510 are the vehicle information representing the status of the vehicle. Each of the vehicle velocity sensor 600 and the lighting switch 5 obtains vehicle information.

The information center 6 stores the display patterns representing the contents, the layouts and the sizes of the images of various models of navigation apparatuses manufactured by plural makers. Latest display patterns are added without delay. The information center 6 transmits to the display apparatus 500 the display pattern of an image for the navigation apparatus 300 connected to the display apparatus 500 through communication with the display apparatus 500. The display apparatus 500, through the communication with the information center 6, can obtain the display patterns of various navigation apparatuses manufactured by plural makers. Thus, it is possible to easily post-install the display apparatus 500 in the vehicle 200 already equipped with the navigation apparatus 300

The configuration of the display apparatus 500 is explained. The display apparatus 500 includes the controller 510, a communicator 22, an image memory 23, a VRAM 530, a driver 540, the head-up display 550, a memory 450, and a card slot 28.

The controller 510 is a microcomputer equipped with a CPU, a RAM and a ROM. The controller 510 is connected to other devices included in the display apparatus 500, and thereby controls the entire apparatus. Various functions included in the controller 510 are detailed later.

The communicator 22 is an input/output circuit that exchanges data with external apparatuses, sensors and others not included in the display apparatus 500. The communicator 22 connected to the RCA terminal of the navigation apparatus 300 receives the image data generated by the navigation apparatus 300 and stores the received image data in the image memory 23. The communicator 22 also connected to the vehicle velocity sensor 600 and the lighting switch 5 receives the vehicle velocity data and the illumination signal, and transmits them to the controller 510. Further, the communicator 22 equipped with a radio communication function performs information communication with the information center 6 that is detailed later. The communication with the information center 6 is performed based on a radio communication technology such as WiMAX (Worldwide Interoperability for Microwave Access) or LTE (Long Term Evolution).

The image memory 23 temporarily stores the image data transmitted from the navigation apparatus 300.

The VRAM 530 is a Video RAM that temporarily stores image data at the time of generation of an image for display on the head-up display 550.

The driver 540 irradiates projection light showing an image from a projection lens to the head-up display 550 to display the image. As the technology for projecting an image, DLP (Digital Light Processing), LCOS (Liquid Crystal On Silicon) or others is adopted.

The head-up display 550 is a transparent glass optical element. The irradiation of projection light by the driver 540 to the head-up display 550 makes an image to be displayed.

The memory 450 is a storage medium that stores data. The memory 450 is a nonvolatile memory, such as EEPROM (Electrical Erasable Programmable Read-Only Memory), flash memory, or hard disk drive equipped with a magnetic disc. The memory 450 stores display pattern data 27a, model data 27b, user data 27c and a program 450e.

The display pattern data 27a is a data table including patterns for display on the head-up display 550 based on the image of the navigation apparatus 300. The display pattern data 27a includes a plurality of records R, each of which has data of "No.," "Display mode," "Time," "Velocity" and "Display pattern." FIG. 3 shows an example of the display pattern data 27a, having 10 pieces of recodes R.

The data in "No." represents the number of a record R.

The data in "Display mode" represents a display mode of an image for display on the display 31 of the navigation apparatus 300. One of "Ordinary road," "Expressway" and "Intersection" is indicated in "Display mode." The data having "Ordinary road" in "Display mode" shows the screen state of the navigation apparatus 300 while the vehicle 200 is traveling on an ordinary road. The data having "Expressway" shows the screen state of the expressway mode while the vehicle 200 is traveling on an expressway. The data having "Intersection" shows the screen state of the right/left turn mode when the vehicle 200 turns right or left in accordance with the route guidance provided by the navigation apparatus 300.

The data in "Time" shows whether it is in the daytime or nighttime. Either "Day" or "Night" is indicated in "Time." "Day" represents the time period from AM 5:00 to PM 6:00; "Night" represents the time period from PM 6:00 to AM 5:00. The time period may be changed in accordance with a season or a region.

The data in "Velocity" shows a traveling velocity of the vehicle 200. One of "High," "Medium" and "Low" is indicated in "Velocity." "High" represents the velocity range of 80 [km/h] or higher; "Medium" represents the velocity range from 31 [km/h] up to 79 [km/h]; "Low" represents the velocity range of 30 [km/h] or lower.

The data in "Display pattern" shows which region in the image displayed on the navigation apparatus 300 is to be displayed on which region in the head-up display 550. Each of the regions is represented in a coordinate of the display 31 of the navigation apparatus 300 or a coordinate of the head-up display 550. The coordinate includes, in the case of a square-shape image, four coordinate points representing four corners. "Display pattern" also includes "Luminance." "Luminance" represents brightness in "%" of the head-up display 550.

The data in "Display pattern" is set so that the head-up display 550 on the vehicle 200 traveling at a lower velocity displays more navigation images. In an example, "Display pattern" of No. 1 of the record R whose velocity is "High" specifies two navigation images to be displayed on the head-up display 550. "Display pattern" of No. 3 of the record R whose velocity is "Low" specifies three navigation images to be displayed on the head-up display 550.

As above, the display apparatus 500 generates an image having more quantity of information as the vehicle 200 is traveling at a lower velocity. Thus, when driving at a lower velocity, the user can obtain more quantity of information from the head-up display 550. On the other hands, the display apparatus 500 generates an image having less quantity of information as the vehicle 200 is traveling at a higher velocity. Thus, when driving at a higher velocity, the user can concentrate his/her attention on the front view while obtaining less quantity of information from the head-up display 550.

In FIG. 2 again, the configuration of the image display system 100 is explained.

The model data 27b specifies a model and a maker of the navigation apparatus 300 for connection to the display apparatus 500. The model name and the maker's name of the navigation apparatus 300 are confirmed by the user, and written in a memory card 28a that is explained later. The model name and the maker's name written in the memory card 28a are transmitted via the card slot 28 to the memory 450, and stored in the memory 450 as the model data 27b.

The user data 27c shows type, layout, size, etc. of the image that the user wants to display on the head-up display 550. The user can set the data according to user's own preference. The data written by the user in the memory card 28a is stored in the memory 450 as the user data 27c.

The program 450e is the firmware read out by the controller 510 for control of the display apparatus 500 through execution.

The card slot 28 is a portion where the memory card 28a that is a portable storage medium is attached and detached, and functions for reading out data from the memory card 28a. When the memory card 28a is attached, the card slot 28 transmits a memory card attachment signal to the controller 510.

The user writes the model data 27b and the user data 27c in the memory card 28a. The user records the model data 27b and the user data 27c in the memory card 28a by use of a personal computer or the like. The user attaches the memory card 28a to the card slot 28, and thereby inputs to the display apparatus 500 the model name and the maker's name of the navigation apparatus 300, and type, layout, size, etc. of the image that the user wants to display on the head-up display 550.

Next, various functions of the controller 510 are explained. The controller 510 includes an image acquisition part 21a, an image extractor 21b, a vehicle information acquisition part 21c, a moving picture determination part 21d, a display controller 21e, an image generation part 21f, a center information acquisition part 21g, and a user setting part 21h.

The image acquisition part 21a acquires image data from the navigation apparatus 300 via the communicator 22. That is, the image acquisition part 21a acquires an image (the first display image) displayed on the display 31 of the navigation apparatus 300 disposed outside the display apparatus 500.

The image extractor 21b extracts an image in a prescribed region from the image data acquired by the image acquisition part 21a. The image extractor 21b determines the prescribed region above in reference to layout information of the display pattern data 27a and the user data 27c stored in the memory 450 for image extraction. The prescribed region is, for example, the center region of the screen or the one-third right part of the screen where image data is displayed. That is, the image extractor 21b extracts a part of the image as an extraction image based on the layout information relevant to the layout of the image displayed on the display 31 of the navigation apparatus 300.

The vehicle information acquisition part 21c acquires the vehicle velocity data transmitted from the vehicle velocity sensor 600, and the illumination signal transmitted from the lighting switch 5 via the communicator 22.

The moving picture determination part 21d determines whether or not the image acquired from the navigation apparatus 300 by the image acquisition part 21a is a part of a moving picture. The moving picture determination part 21d compares two temporally continuous images in each picture element acquired by the image acquisition part 21a. When the picture elements more than a prescribed ratio or above differ in color, the moving picture determination part 21d determines that the image is a part of a moving picture.

The display controller 21e transmits to the driver 540 the image data that has been stored in the VRAM 530 since being generated by the image generation part 21f. Then, the display controller 21e controls the driver 540 to display the image on the head-up display 550.

The image generation part 21f generates an image for display on the head-up display 550 by combining the image extracted in the prescribed region by the image extractor 21b and the image showing a vehicle velocity. That is, the image generation part 21f generates an image (the second display image) to be displayed on the head-up display 550 by use of the extraction image extracted by the image extractor 21b. In this case, the image generation part 21f determines, in reference to the display pattern data 27a, which region of the head-up display 550 the image is to be displayed in. The image generation part 21f also acquires vehicle velocity data from the vehicle information acquisition part 21c so as to generate an image showing a vehicle velocity. The image generated by the image generation part 21f is stored temporarily in the VRAM 530.

The center information acquisition part 21g acquires the display pattern data 27a from the information center 6 via the communicator 22. In this case, the center information acquisition part 21g transmits to the information center 6 the model name and the maker's name of the navigation apparatus 300 connected to the display apparatus 500 in reference to the model data 27b stored in the memory 450, in order to request the display pattern data 27a.

The user setting part 21h detects that the memory card 28a is attached to the card slot 28, reads out the user data stored in the memory card 28a, and then stores the user data in the memory 450.

1-3. Example of Display Image

Figure 4:
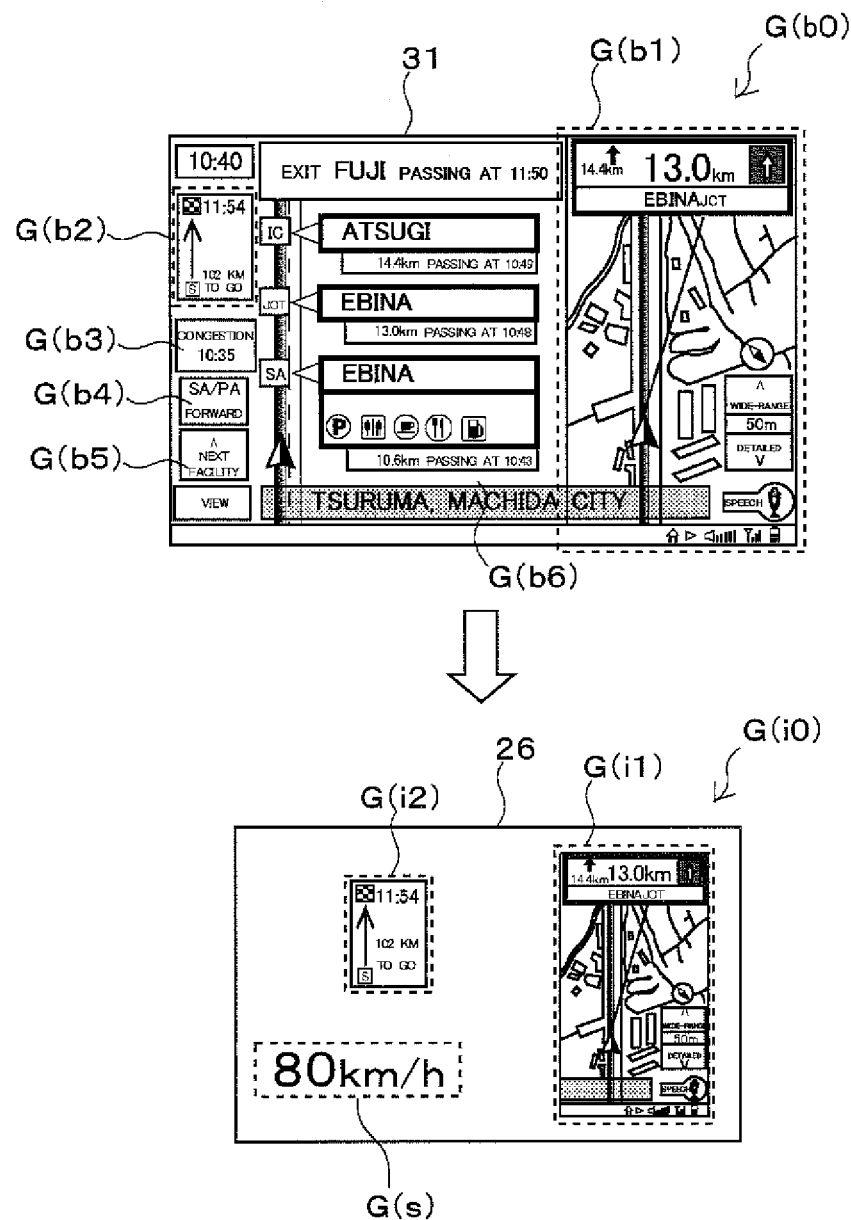
FIG. 4 shows example images for display on a display of a navigation apparatus and a head-up display.
Figure 5:
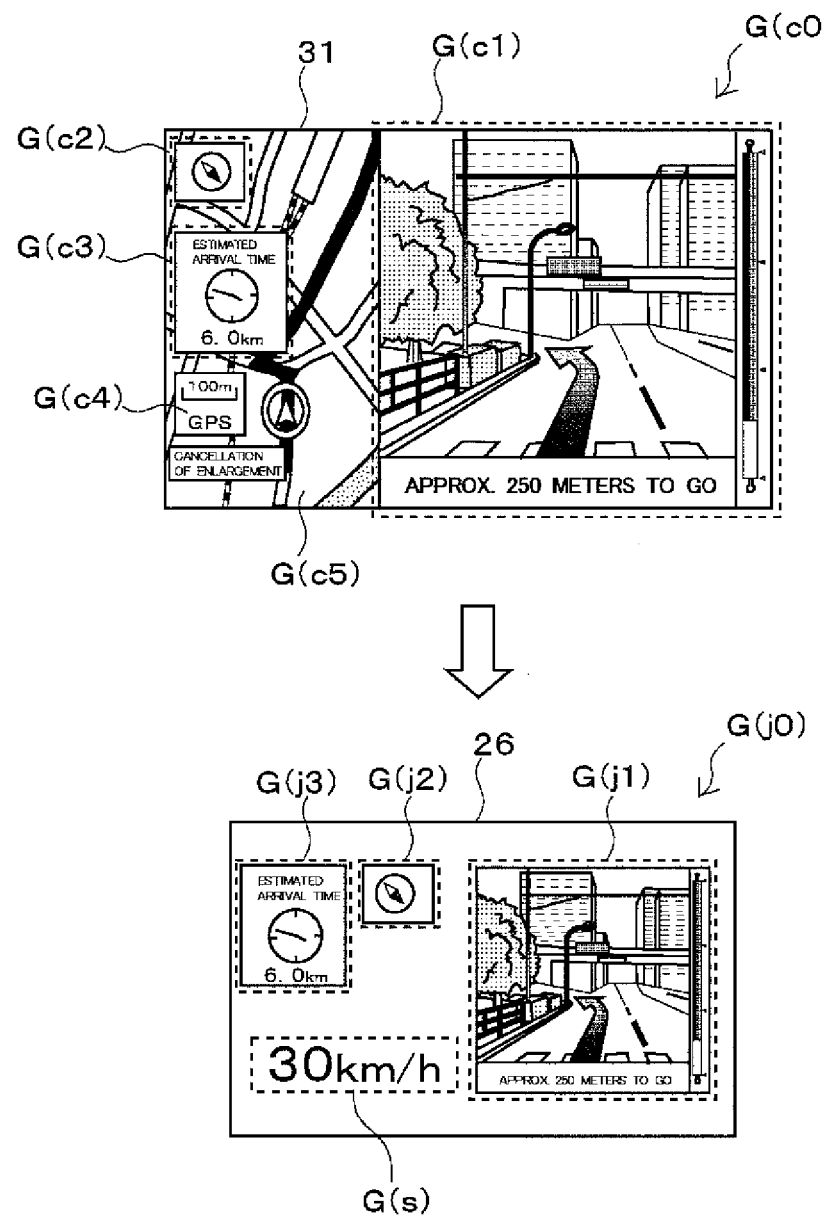
FIG. 5 shows other example images for display on the display of the navigation apparatus and the head-up display.

Next explanation is about example images for display on the display 31 of the navigation apparatus 300, and example images generated based on the images on the display 31 for display on the head-up display 550 of the display apparatus 500. FIG. 4 and FIG. 5 show the examples of these images. Each of the dotted lines shown in FIG. 4 and FIG. 5 represents the region of an image for the purpose of explanation, not being actually shown on the screen. FIG. 4 shows the display examples on the display 31 and the head-up display 550, of No. 4 of the record R in the display pattern data 27a shown in FIG. 3. FIG. 5 shows the display examples on the display 31 and the head-up display 550, of No. 9 of the record R in the display pattern data 27a shown in FIG. 3.

The upper figure of FIG. 4 shows a display image G (b0) for display on the display 31 of the navigation apparatus 300 while the vehicle 200 is traveling on an expressway in the daytime.

The display image G (b0) includes a bird's-eye map image G (b1), a destination information image G (b2) that shows a distance and required time to a destination, a traffic congestion information image G (b3) that shows occurrence time of a traffic congestion, a SA/PA image G (b4) that shows a service area or a parking area, a facility information image G (b5) that shows facility information, and an express facility image G (b6) that shows facility on the expressway that the vehicle will go through.

In the display image G (b0) shown while the vehicle 200 is traveling on an expressway, the bird's-eye map image G (b1) is displayed in approx. one-third right part of the screen on the display 31. The destination information image G (b2), the traffic congestion information image G (b3), the SA/PA image G (b4), and the facility information image G (b5) are displayed vertically in one row of the left edge of the screen on the display 31. The expressway facility image G (b6) is displayed in approx. two-thirds left part of the screen on the display 31.

The lower figure of FIG. 4 shows a head-up display image G (i0) which is generated by the image extractor 21b and the image generation part 21f based on the display image G (b0) and the display pattern data 27a, and thereby displayed by the display controller 21e on the head-up display 550 of the display apparatus 500.

The head-up display image G (i0) includes a bird's-eye map image G (i1) that is generated based on the bird's-eye map image G (b1) through extraction from the display image G (b0), a destination information image G (i2) that is generated based on the destination information image G (b2) through the extraction, and a velocity image G (s) that is generated based on the velocity data of the vehicle 200.

The upper figure of FIG. 5 shows a display image G (c0) for display on the display 31 of the navigation apparatus 300 when the vehicle 200 approaches an intersection where the vehicle 200 is going to turn left while the vehicle 200 is traveling on an ordinary road in the daytime.

The display image G (c0) includes an intersection image G (c1), a direction image G (c2) that shows a direction, a destination information image G (c3) that shows expected arrival time and a distance to the destination, a distance information image G (c4) that shows the scale of a map, and a bird's-eye map image G (c5) that shows a bird's-eye map of the current location of the vehicle.

In the display image G (c0) shown when the vehicle 200 approaches the intersection, the intersection image G (c1) is displayed in approx. two-thirds right part of the screen on the display 31.

The direction image G (c2) showing a direction, the destination information image G (c3), and the distance information image G (c4) are displayed vertically in one row of the left edge of the screen on the display 31. The bird's-eye map image G (c5) is displayed in approx. one-third left part of the screen on the display 31.

The lower figure of FIG. 5 shows a head-up display image G (j0) which is generated by the image extractor 21b and the image generation part 21f based on the display image G (c0) and the display pattern data 27a, and thereby displayed by the display controller 21e on the head-up display 550 of the display apparatus 500.

The head-up display image G (j0) includes an intersection image G (j1) that is generated based on the intersection image G (c1) through extraction from the display image G (c0), a direction image G (j2) that is generated based on the direction image G (c2) through the extraction, and the velocity image G (s) that is generated based on velocity data of the vehicle 200.

1-4. Processing

The processing procedure on the display apparatus 500 is explained. Each of FIG. 6, FIG. 7, FIG. 8 and FIG. 9 shows the processing procedure on the display apparatus 500. The processing is executed repeatedly in a prescribed cycle. In the flowcharts shown in FIG. 6 and the following figures, the head-up display is referred to as HUD.

First, the user setting part 21*h* executes the processing for setting the model data 27*b* and the user data 27*c* (step S100). The setting processing by the user setting part 21*h* is to store the model name and the maker's name of the navigation apparatus 300 as the model data 27*b* in the memory 450, and the screen configuration or others according to user's preference as the user data 27*c* in the memory 450. The processing is detailed later.

After the user setting part 21*h* executes the setting processing, the center information acquisition part 21*g* executes the processing for setting the display pattern data 27*a* (step S101). The processing for setting the display pattern data 27*a* is to acquire from the information center 6 the display pattern data 27*a* of the navigation apparatus 300 connected to the display apparatus 500, and to store the acquired data in the memory 450. The processing is detailed later.

Next, the image acquisition part 21*a* acquires the image displayed on the display 31 of the navigation apparatus 300 via the communicator 22 and the image memory 23 (step S102).

After the image acquisition part 21*a* acquires the image data, the vehicle information acquisition part 21*c* acquires via the communicator. 22 the vehicle velocity data transmitted from the vehicle velocity sensor 600 and the illumination signal transmitted from the lighting switch 5 (step S103 and step S104).

Next, the moving picture determination part 21*d* determines whether or not the image data acquired by the image acquisition part 21*a* is a part of a moving picture by the method described above (step S105).

In the case where the moving picture determination part 21*d* determines that the image data is a part of a moving picture (Yes at the step S105), the display controller 21*e* determines whether the vehicle 200 is traveling or not (step S106). The display controller 21*e* determines whether the vehicle 200 is traveling or not, based on the vehicle velocity data acquired by the vehicle information acquisition part 21*c*. In an example, in the case where the vehicle velocity data does not show 0 [km/h], the display controller 21*e* determines that the vehicle 200 is traveling.

In the case where the display controller 21*e* determines that the vehicle 200 is traveling (Yes at the step S106), the display controller 21*e* executes the processing for preventing the image of the navigation apparatus 300 acquired by the image acquisition part 21*a* from being displayed on the head-up display 550 (step S107). That is, in the case where the display controller 21*e* determines that the vehicle 200 is traveling, the processing for generating an image for display on the head-up display 550 is not executed. Or, the display controller 21*e* controls the driver 540 not to transmit the image generated and stored in the VRAM 530 to the head-up display 550. During the vehicle 200 traveling, a moving picture is not to be displayed on the head-up display 550. Thus, the user can concentrate on driving without his/her attention being distracted by the moving picture. The moving picture here is video not relevant to driving, for example, the video of a television program or through a video device. After the execution of the step S107, the processing is ended. This is because the execution of the processing for generating or displaying an image is no more required while the vehicle 200 is traveling.

In the case where the moving picture determination part 21*d* determines that the acquired image is not a part of a moving picture (No at the step S105), or the case where the display controller 21*e* determines that the vehicle 200 is not traveling (No at the step S106), the processing moves to the step where the display controller 21*e* and the image generation part 21*f* execute the processing for generating an image to be displayed on the head-up display 550 (step S108). This is because, since the image of the navigation apparatus 300 is not a moving picture or since the vehicle 200 is not traveling even if the image is a moving picture, there is no trouble caused by the generation of the image and the display of the generated image on the head-up display 550. The processing for generating an image is detailed later.

After the image to be displayed on the head-up display 550 is generated, the display controller 21*e* controls the driver 540 to display on the head-up display 550 the image generated and stored in the VRAM 530 (step S109).

After the image is displayed on the head-up display 550, the image acquisition part 21*a* determines whether the image of the navigation apparatus 300 is further transmitted to the display apparatus 500 (step S110). That is, the image acquisition part 21*a* determines whether a new image of the navigation apparatus 300 is transmitted to the image memory 23 based on the data in a prescribed address of the image memory 23.

In the case where the image acquisition part 21*a* determines that the image of the navigation apparatus 300 is not transmitted to the image memory 23 (No at the step S110), the processing is ended here. This is because, in the case where there is no image transmitted from the navigation apparatus 300 to the display apparatus 500, it is deemed that route guidance for a user has been ended, and thus the processing for generating a display image or displaying the generated image on the head-up display 550 is no more required. However, even in the case where it is determined that the navigation image is not displayed on the display 31, only the image G (s) showing a vehicle velocity may be displayed on the head-up display 550, without ending the processing.

In the case where the image acquisition part 21*a* determines that the image of the navigation apparatus 300 is transmitted (Yes at the step S110), the processing goes back to the step S102, and the processing for acquiring the image transmitted to the image memory 23 is executed. After the execution of the step S102, the steps from the step S103 are executed again. Thereby, the processing for generating the image to be displayed on the head-up display 550 and the processing for displaying the generated image on the head-up display 550 are executed repeatedly until the transmission of the image of the navigation apparatus 300 is terminated.

Figure 7:
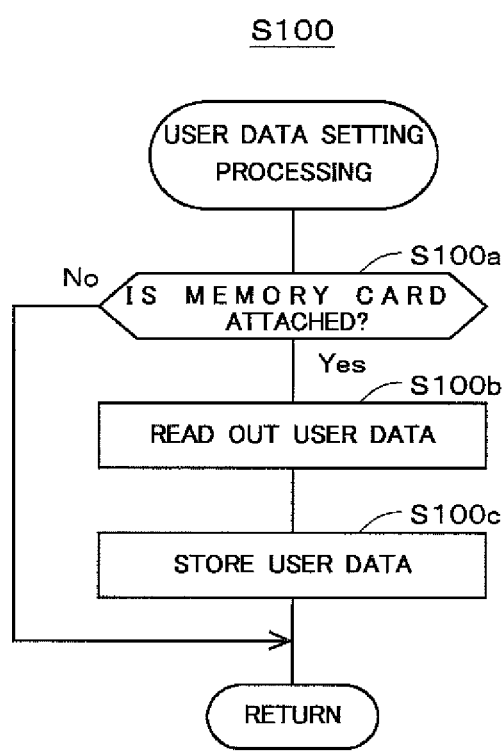
FIG. 7 shows another processing procedure on the display apparatus of the first embodiment.

Next, the processing for setting the model data 27*b* and the user data 27*c* by the user setting part 21*h* at the step S100 is detailed. FIG. 7 shows the details of the setting processing by the user setting part 21*h*.

First, the user setting part 21*h* determines whether the memory card 28*a* is attached to the card slot 28 or not (step S100*a*). The user setting part 21*h* may make the determination based on whether or not there is the card slot attachment signal transmitted from the card slot 28 when the memory card 28*a* is attached to the card slot 28.

Figure 6:
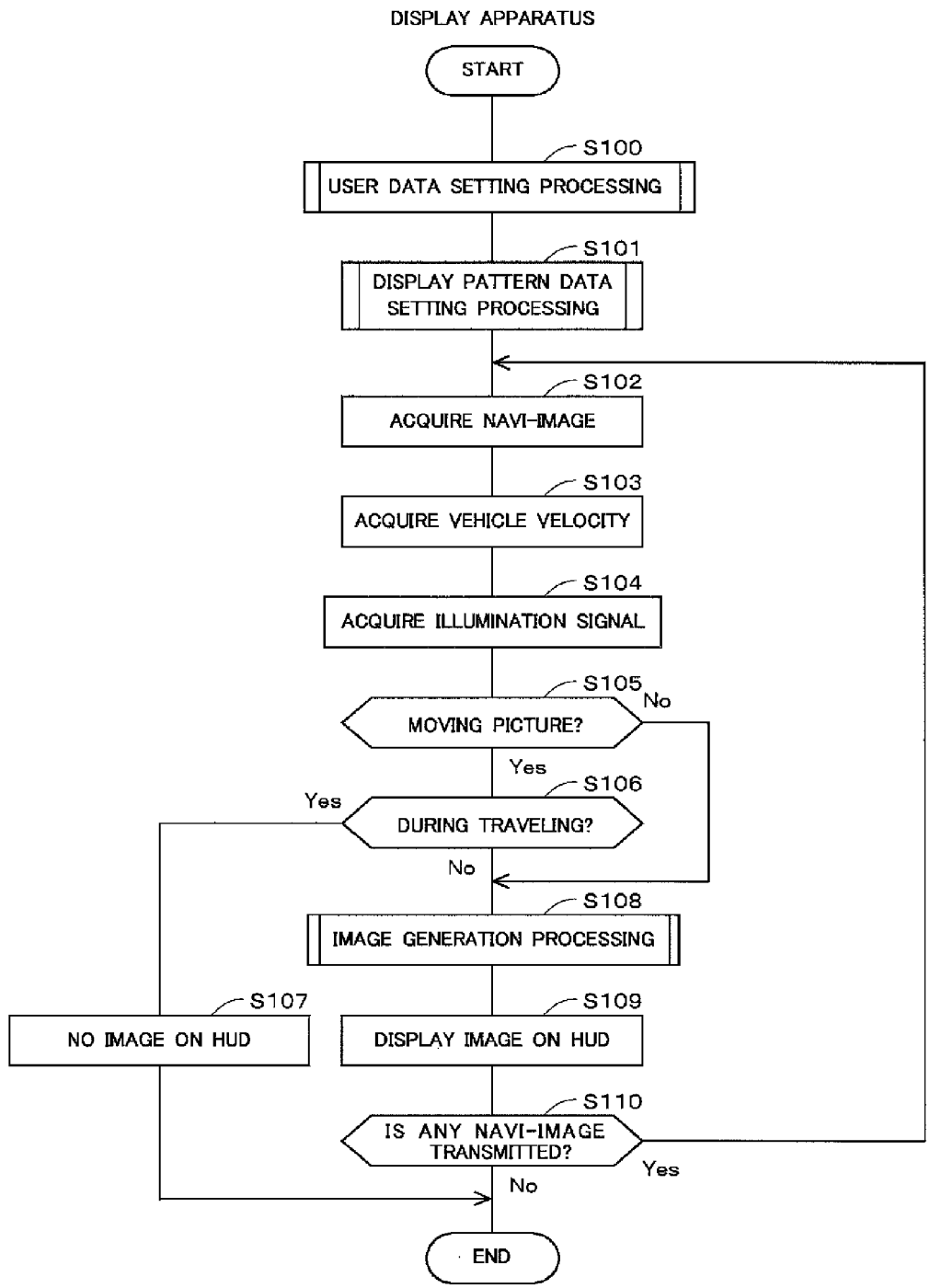
FIG. 6 shows a processing procedure on a display apparatus of the first embodiment.

In the case where the user setting part 21h determines that the memory card 28a is not attached to the card slot 28 (No at the step S100a), the processing goes back to the steps in FIG. 6, and the steps from the step S101 are executed.

In the case where the user setting part 21h determines that the memory card 28a is attached to the card slot 28 (Yes at the step S100a), the user setting part 21h controls the card slot 28 to read out the model data 27b and the user data 27c from the memory card 28a, and stores the read-out data in the memory 450 (step S100b and step S100c).

After the model data 27b and the user data 27c are read out and stored, the processing goes back to the steps in FIG. 6, and the steps from the step S101 are executed.

Figure 8:
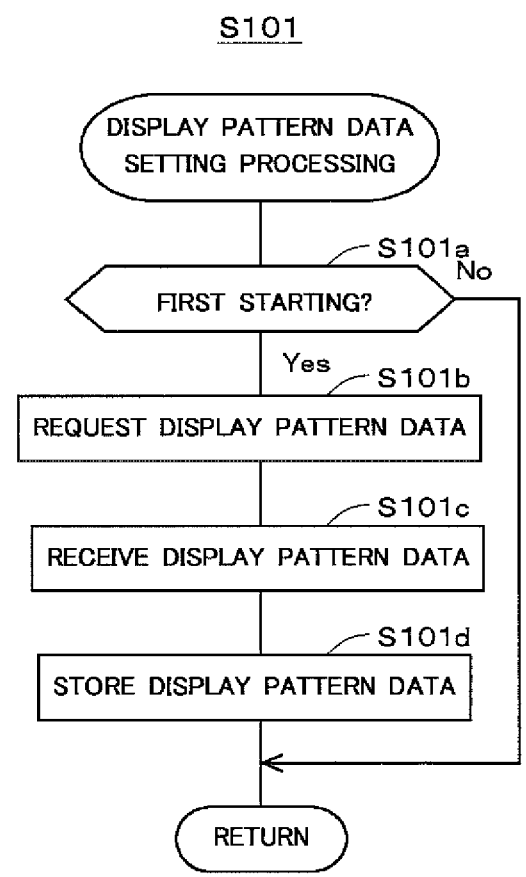
FIG. 8 shows another processing procedure on the display apparatus of the first embodiment.

Next, the processing for setting the display pattern data 27a at the step S101 is detailed. FIG. 8 shows the processing for setting the display pattern data 27a.

In the processing for setting the display pattern data 27a, first the center information acquisition part 21g determines whether the display controller 21e is started for the first time after the connection to the navigation apparatus 300 (step S101a). For the determination, a prescribed flag may be operated at the time when the navigation apparatus 300 is connected to the communicator 22, and then the status of the flag may be stored in the memory 450. This allows the center information acquisition part 21g to determine whether the display controller 21e is started for the first time after the connection to the navigation apparatus 300, based on the prescribed flag stored in the memory 450.

In the case where the center information acquisition part 21g determines that the start of the display controller 21e is not the first time after the connection to the navigation apparatus 300 (No at the step S101a), the processing goes back to the steps in FIG. 6, and the steps from the step S102 are executed.

In the case where the center information acquisition part 21g determines that the start of the display controller 21e is the first time after the connection to the navigation apparatus 300 (Yes at the step S101a), the center information acquisition part 21g requests the display pattern data 27a of the navigation apparatus 300 to the information center 6 (step S101b). In this case, the center information acquisition part 21g reads out the model data 27b from the memory 450 and transmits the data to the information center 6.

The center information acquisition part 21g receives the display pattern data 27a corresponding to the model data 27b, transmitted from the information center 6 (step S101c).

The center information acquisition part 21g stores the received display pattern data 27a in the memory 450 (step S101d). As above, the user can easily obtain the layout information and others of the image for various models of navigation apparatuses, by obtaining the display pattern data 27a including the layout information and others of the image from the information center.

After the center information acquisition part 21g stores the display pattern data 27a in the memory 450, the processing goes back to the steps in FIG. 6, and the steps from the step S102 are executed.

Figure 9:
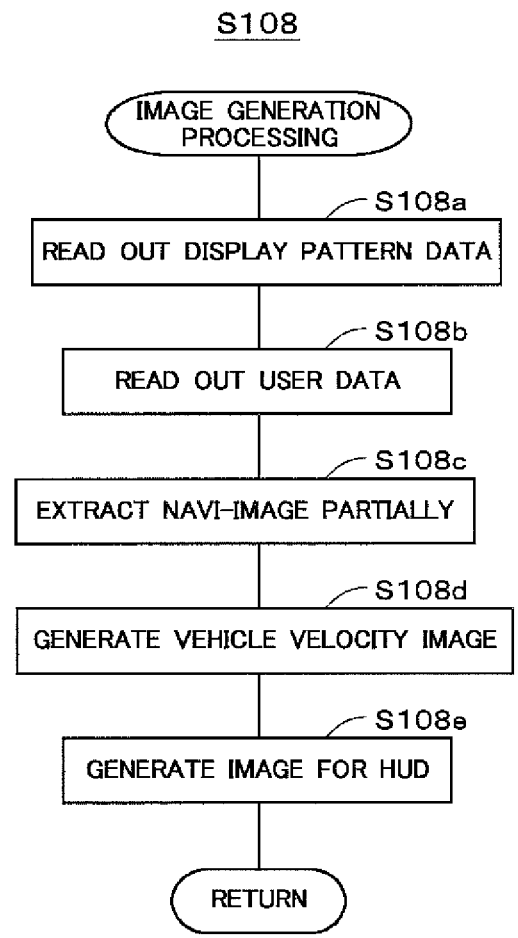
FIG. 9 shows another processing procedure on the display apparatus of the first embodiment.

Next, the image generation processing at the step S108 is detailed. FIG. 9 shows the image generation processing.

In the image generation processing, first the image extractor 21b reads out the display pattern data 27a and the user data 27c from the memory 450 (step S108a and step S108b).

After reading out the display pattern data 27a and the user data 27c, the image extractor 21b extracts a part of the image of the navigation apparatus 300 acquired by the image acquisition part 21a, based on the read-out display pattern data 27a and the read-out user data 27c (step S108c).

In this case, based on the image of the navigation apparatus 300 acquired by the image acquisition part 21a, the image extractor 21b extracts an image by referring to the record R in the display pattern data 27a corresponding to one of the display modes for navigation: Ordinary road; Expressway; or Intersection. The image extractor 21b also determines a time period based on whether the illumination signal exists, and extracts an image by referring to the record R in the display pattern data 27a corresponding to Day or Night. Since the image is extracted based on whether the illumination signal exists, the generated image for the head-up display has appropriate luminance for the time period: Day; or Night. The image extractor 21b also determines a velocity of the vehicle 200 based on the vehicle velocity data, and extracts an image by referring to the record R in the display pattern data 27a corresponding to the velocity: High; Medium; or Low.

The image generation part 21f generates the image G (s) showing the current vehicle velocity based on the vehicle velocity data acquired by the vehicle information acquisition part 21c (step S108d). The image G (s) is, for example, a letter image showing "80[km/h]." As above, the image for display on the head-up display 550 is generated based on the vehicle velocity data that is vehicle information. Thereby, the image in accordance with the status of the vehicle 200 is displayed on the head-up display 550.

After generating the image G (s) showing the vehicle velocity, the image generation part 21f generates an image for display on the head-up display 550 by combining the generated image G (s) showing the vehicle velocity and a part of the image of the navigation apparatus 300 extracted by the image extractor 21b (step S108e). Both of the image extraction processing by the image extractor 21b and the image generation processing by the image generation part 21f are executed on the VRAM 530.

The user can check a vehicle velocity of the vehicle 200 on the head-up display 550 without looking at a speedometer because the image G (s) showing a vehicle velocity is displayed on the head-up display 550. The vehicle velocity is one of the most important information for the user driving a vehicle. Therefore, displaying a vehicle velocity on the head-up display 550 improves convenience for the user driving a vehicle.

After the image generation part 21f generates the image for display on the head-up display 550, the processing goes back to the steps in FIG. 6, and the steps from the step S109 are executed.

As above, the display apparatus 500 acquires the first display image displayed on the display 31 of the navigation apparatus 300, and extracts a part of the first display image based on the layout information relevant to the layout of the first display image. Then, the display apparatus 500 generates the second display image by use of the extracted image, and displays the generated second display image on the head-up display 550. Thereby, a navigation image of any of the various models of the navigation apparatuses 300 is displayed on the head-up display 550. Therefore, it is possible to easily post-install the head-up display 550 on the vehicle 200 already equipped with the navigation apparatus 300.

2. Second Embodiment 2-1. Outline

Next, the second embodiment is explained. On the image display system 100 of the first embodiment, the display apparatus 500 and the navigation apparatus 300 are connected by a connection line. The navigation apparatus 300 outputs image data to the RCA terminal, and the display apparatus 500 receives the image data from the RCA terminal. However, every model for the navigation apparatus 300 already installed on the vehicle 200 may not have a video output terminal such as RCA terminal. In the case where the navigation apparatus 300 does not have any function for outputting such data, it is very difficult to post-install the head-up display 550 in the vehicle 200.

Thus, an image display system 100 of the second embodiment acquires an image by shooting a display 31 of a navigation apparatus 300 by a camera. It is possible to display on a head-up display 550 the navigation image even for the navigation apparatus 300 equipped with no video output terminal.

Figure 10:
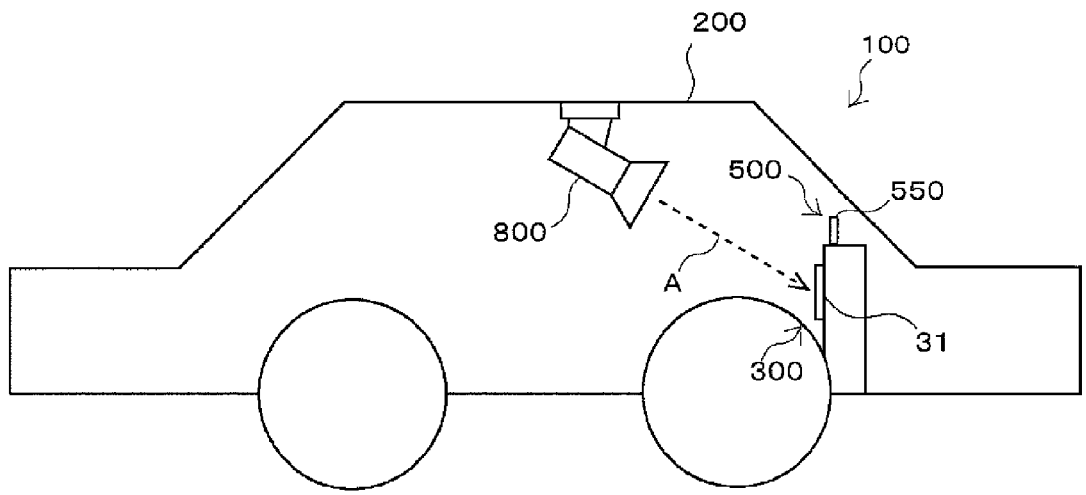
FIG. 10 shows an outline of an image display system of the second embodiment.

FIG. 10 shows the outline of the image display system 100 of the second embodiment. The image display system 100 of the second embodiment includes a camera 800 that is installed in a vehicle 200 and connected to a display apparatus 500.

The camera 800 shoots the display 31 of the navigation apparatus 300, and transmits the shot image of the navigation apparatus 300 to the display apparatus 500.

The display apparatus 500 displays on the head-up display 550 a part of the image of the navigation apparatus 300 shot by the camera 800. The display apparatus 500 of the second embodiment does not require the connection to the navigation apparatus 300, unlike in the first embodiment. Thus, the navigation apparatus 300 does not require any of the video output terminals such as RCA terminal. That is, even in the case where the navigation apparatus 300 already installed in the vehicle 200 includes none of the video output terminals, it is possible to easily post-install the head-up display 550 in the vehicle 200.

The configuration and processing on the image display system 100 of the second embodiment include the same configuration and processing of the first embodiment. Thus, the following explanation is mainly about the different points from the first embodiment.

2-2. Configuration

Figure 11:
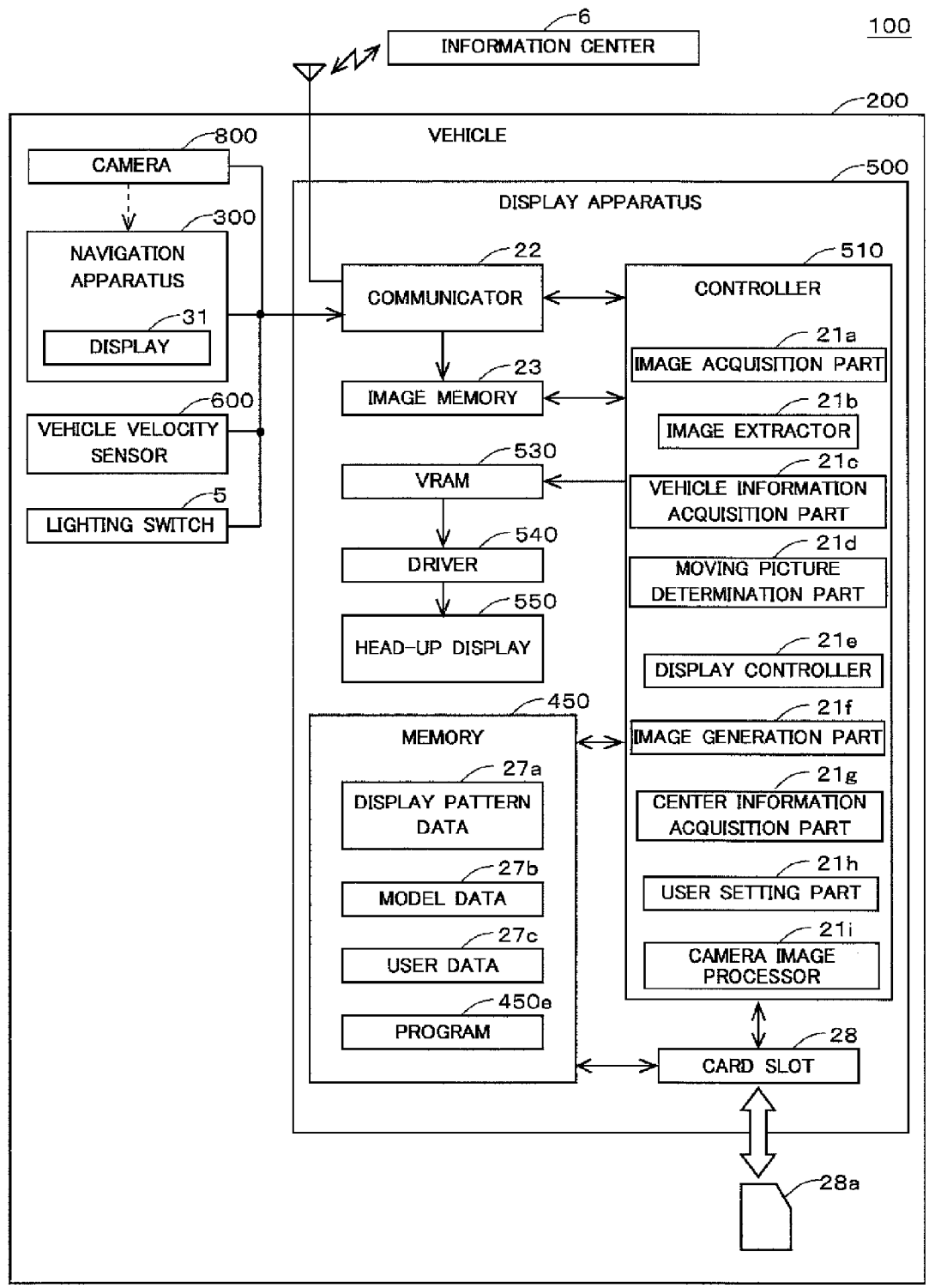
FIG. 11 shows a configuration of the image display system of the second embodiment.

First, the configuration of the image display system 100 of the second embodiment is explained. FIG. 11 shows the configuration of the image display system 100 of the second embodiment. Unlike the first embodiment, the display apparatus 500 is connected to the camera 800, and a controller 510 includes a camera image processor 21i. The navigation apparatus 300 is not connected to the display apparatus 500. Other parts of the configuration are the same as the first embodiment, and thereby functioning as the same.

The camera 800 is installed inside the vehicle cabin of the vehicle 200. An optical axis A of the camera 800 points toward the display 31 of the navigation apparatus 300 so that the camera 800 shoots the display 31. The camera 800 is connected to the display apparatus 500, and transmits the shot image data to the display apparatus 500. The image data is transmitted to the display apparatus 500 via a communicator 22 and stored in an image memory 23. The stored image data is transmitted to the controller 510 by an image acquisition part 21a.

The camera image processor 21i processes the image data of the display 31 of the navigation apparatus 300 shot by the camera 800 so as to determine whether or not a navigation image is displayed on the display 31. The determination may be made by a so-called pattern matching method by use of the navigation image stored in advance.

The camera image processor 21i determines whether there is any change in the image content displayed on the display 31. The change in the image content is seen in the case: where a map is being scrolled while a vehicle is traveling; where a light/left turn guidance is displayed in a screen; where a display mode is changed from Ordinary road mode to Expressway mode; and where a screen is changed from a navigation screen to an audio operation screen or a DVD replay screen. The camera image processor 21i determines whether there is any change in the image content, by comparing between the image data transmitted from the camera 800 and the image data transmitted previously.

2-3. Processing

Figure 12:
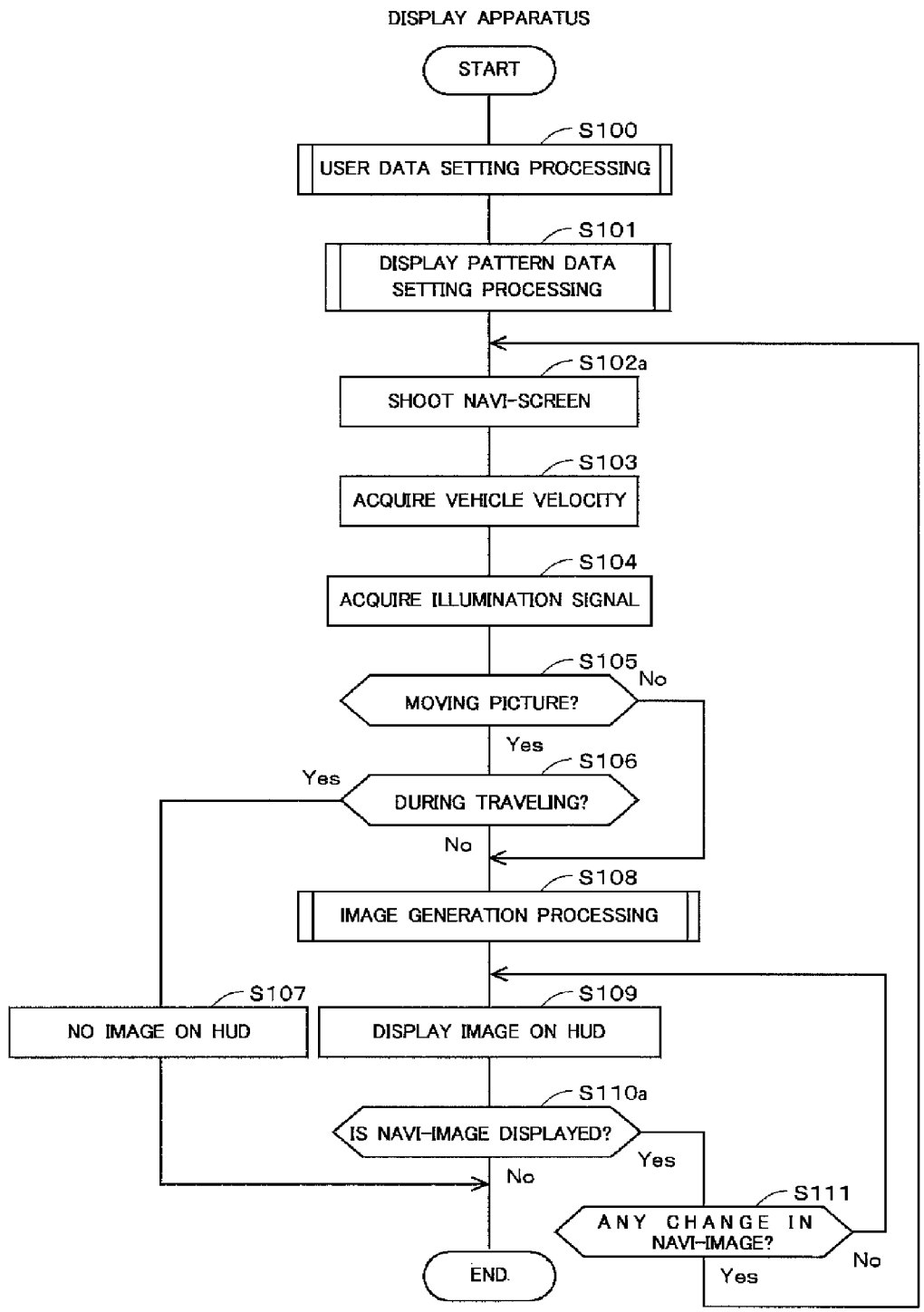
FIG. 12 shows a processing procedure on a display apparatus of the second embodiment.

Next, the processing procedure on the image display system 100 of the second embodiment is explained. FIG. 12 shows the flowchart of the processing procedure on the image display system 100 of the second embodiment. Unlike the first embodiment, the processing on the display apparatus includes a step S102a instead of the step S102, and a step S110a instead of the step S110, and additionally includes a step S111. Other steps are the same as those in the first embodiment.

After the processing for setting the display pattern data is executed at the step S101, the camera 800 shoots the display 31 (step S102a). After shooting the display 31, the camera 800 transmits the image data to the display apparatus 500. After the step S102a is executed, the steps from the step S103 explained above are executed.

After a display controller 21e displays an image of the display 31 shot by the camera 800 on the head-up display 550 at the step S109, the camera image processor 21i determines based on the image data transmitted by the camera 800 whether or not a navigation image is displayed on the display 31 (step S110a).

In the case where the camera image processor 21i determines that any navigation image is not displayed on the display 31 (No at the step S110a), the processing is ended. Since any navigation image is not displayed on the display 31, it is no more required to display any image on the head-up display 550. The case where any navigation image is not displayed on the display 31 is, for example, the case where the vehicle 200 has arrived at a destination, and navigation guidance is ended. Even in the case where it is determined that any navigation image is not displayed on the display 31, only an image G (s) showing a vehicle velocity may be displayed on the head-up display 550 without ending of the processing.

When determining that a navigation image is displayed on the display 31 (Yes at the step S110a), the camera image processor 21i further determines whether there is any change in the navigation image displayed on the display 31 (step S111).

When the camera image processor 21i determines that there is no change in the navigation image (No at the step S111), the display controller 21e continuously displays on the head-up display 550 the navigation image of the display 31 shot by the camera 800 (step S109).

When the camera image processor 21i determines that there is some change in the navigation image (Yes at the step S111), the processing goes back to the step S102a explained above, and the steps for shooting the display 31 by the camera 800 and other steps are executed.

As above, the image display system 100 of the second embodiment acquires an image by shooting the display 31 of the navigation apparatus 300 by a camera. Thus, even in the case where the navigation apparatus 300 already installed in the vehicle 200 includes no video output terminal, it is possible to easily post-install the head-up display 550 in the vehicle 200.

3. Modifications of the First Embodiment and the Second Embodiment

So far, the first embodiment and the second embodiment of the invention have been explained. However, both of the first embodiment and the second embodiment may have various modifications. Hereafter, the modifications are explained. All embodiments including the embodiment described above and the embodiments to be described below can be arbitrarily combined with others.

On the display apparatus 500 of the image display system 100 of the embodiments described above, an image for display on the head-up display 550 is generated when image data is transmitted from the navigation apparatus 300 to the display apparatus 500, or when there is some change in the image of the navigation apparatus 300. However, the timing for generating an image for display on a head-up display 550 may be based on the contents of the sound output by a navigation apparatus 300.

In this case, a display apparatus 500 of an image display system 100 is connected to a microphone that collects the sound output by the navigation apparatus 300. The sound output by the navigation apparatus 300 is collected by the microphone. Based on the collected sound, an image for display on the head-up display 550 is generated. That is, the image for display on the head-up display 550 may be generated and changed based on the sound output by the navigation apparatus 300, unlike the method based on the change in the image transmitted from the navigation apparatus 300.

In an example, based on the sound guidance "Turn left, soon" output by the navigation apparatus 300, a new image is generated by change of a display pattern from Ordinary road mode to Intersection mode. Since the image is changed in accordance with the timing of the sound guidance, the timing of image change is matched with the timing of user's recognition. Thus, the user can look at the changed image without feeling a sense of incompatibility. That is, since it is determined to extract a region from an image based on the sound output by the navigation apparatus 300, it is possible to display the region appropriately corresponding to the status of navigation on the head-up display 550.

Figure 13:
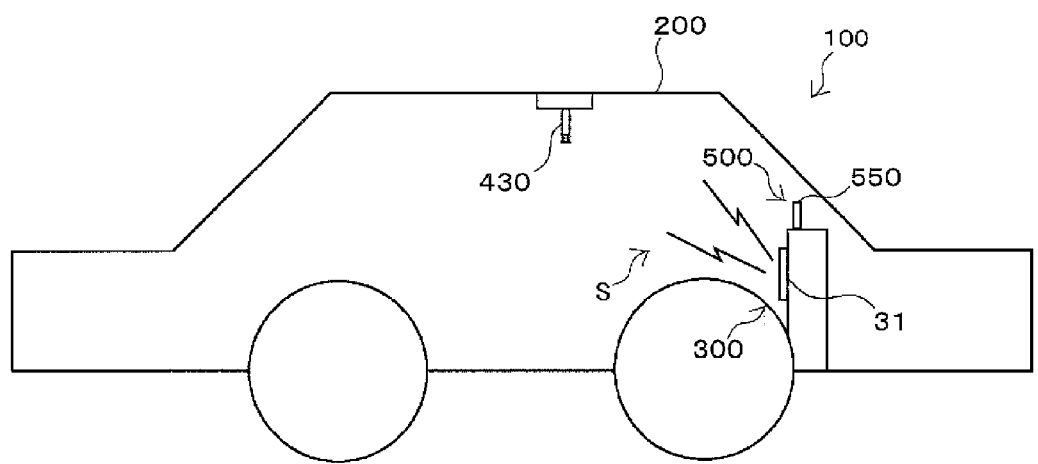
FIG. 13 shows a modification of the image display system.

FIG. 13 shows the image display system 100 including the display apparatus 500 connected to a microphone 430. The microphone 430 that is installed in the vehicle cabin of a vehicle 200 collects a sound S output by the navigation apparatus 300, and transmits the sound data including the sound S to the display apparatus 500. The sound S is, for example, "400 meters ahead, turn left," "Destination area soon," or "Expressway mode is on." Especially the sound telling the timing for changing an image for display on a display 31 of the navigation apparatus 300 corresponds to the sound S. When the sound data is transmitted from the microphone 430, a controller 510 understands the meaning of the sound and grasps which image to be displayed. A publicly-known technology is available for execution of the processing for understanding the meaning of the sound.

An image extractor 21b and an image generation part 21f generate an image for display on the head-up display 550 based on the meaning of the sound data transmitted from the microphone 430 and display pattern data 27a. Here is an example of the case where an image is displayed on the head-up display 550 based on No. 2 (display mode: Ordinary road) of the record R in the display pattern data 27a shown in FIG. 3. When the microphone 430 collects the sound data telling "Turn left corner, soon," the image extractor 21b and the image generation part 21f change an image to the display pattern conforming to No. 8 (display mode: Intersection) of the record R in the display pattern data 27a. Thereby, the display pattern is appropriately changed at the timing of the user listening to the sound of the navigation apparatus 300. Thus, the user can look at an image after change without feeling a sense of incompatibility.

Other modifications are explained. In the explanation above, the display apparatus 500 is installed in a vehicle. The vehicle here includes a two-wheel vehicle, a train, an airplane, and a ship, as well as an automobile. In addition, the vehicle includes the ones for military use and commercial use, and also private use and business use. A display apparatus 500 may be installed in a house, a building or the like, not only in a vehicle.

In the explanation above, the display apparatus 500 is installed in a vehicle. However, a display apparatus 500 may be a part of a so-called wearable computer. In this case, a head-up display 550 may be a head-mounted display that displays video on a transparent plate of glasses, or a helmet-type display that displays video on a helmet visor.

In the explanation above, the determination of daytime or nighttime is made based on the output by the lighting switch 5. However, the determination of daytime or nighttime may be made based on the illuminance measured by an illuminance sensor installed on an image display system 100.

In the explanation above, data transmission to the display apparatus 500 is conducted by the memory card 28a. However, it is not limited to the use of the memory card 28a. By use of a display apparatus 500 having a connection part to a personal computer (PC), data may be transmitted from a PC to the display apparatus 500 via a connection line. Or, by use of a display apparatus 500 having a radio receiver, data may be transmitted from a PC to the display apparatus 500 by radio communication.

In the explanation of the second embodiment, the camera 800 is installed in the vehicle cabin of the vehicle 200. However, it is not necessary to install the camera 800 in the vehicle cabin of the vehicle 200. A camera 800 may be a portable camera, or a camera that functions as a part of another device, such as a mobile phone with camera. In this case, since the camera 800 is not installed in the vehicle cabin of a vehicle 200, a user holds the camera 800 so as to make the optical axis of the camera 800 point a display 31 of a navigation apparatus 300.

4. Third Embodiment

4-1. Outline

Figure 14:
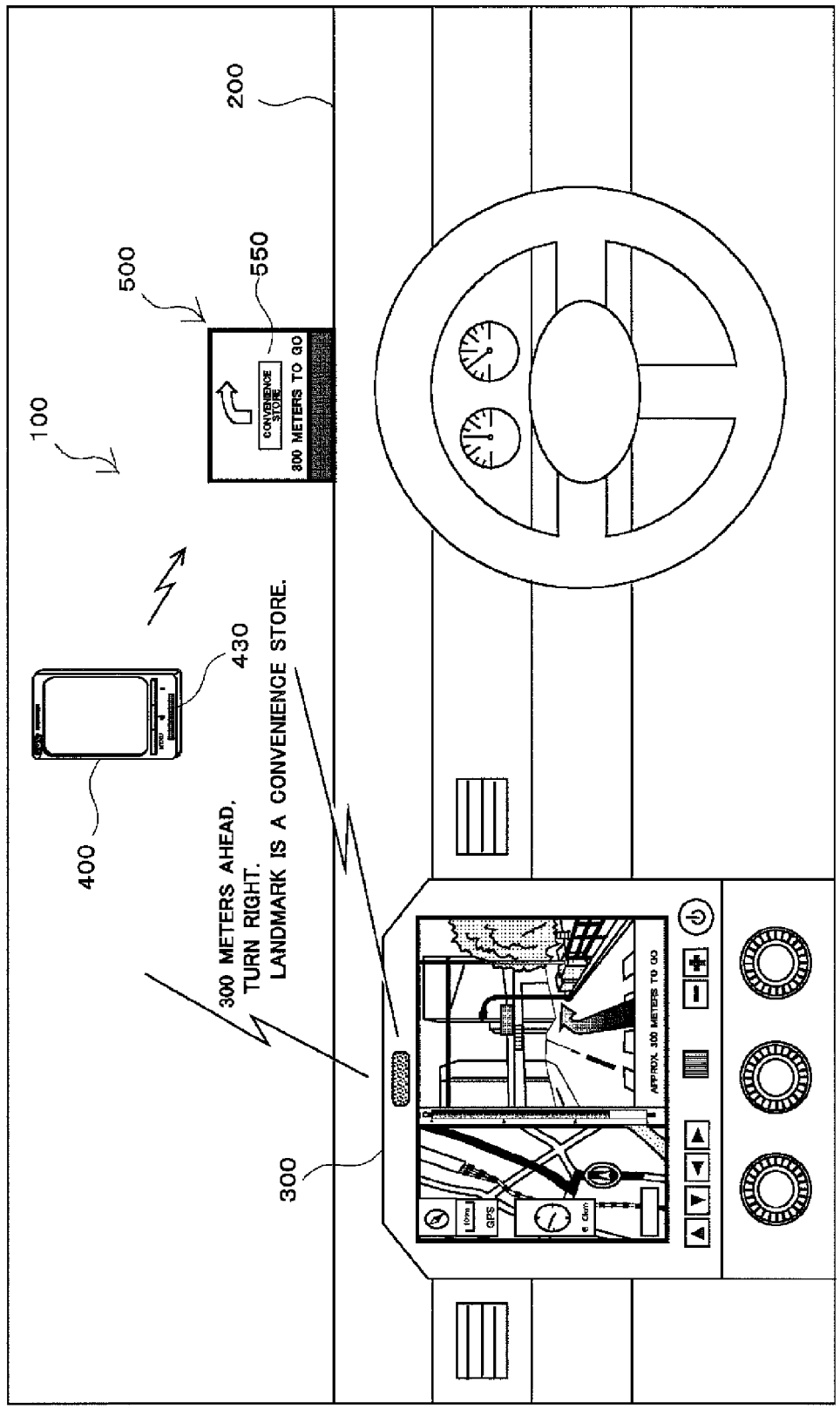
FIG. 14 shows an outline of an image display system of the third embodiment.

Next, the third embodiment is explained. FIG. 14 shows the outline of an image display system 100 of the third embodiment. The image display system 100 includes a navigation apparatus 300 installed in a vehicle 200, a mobile apparatus 400 having a microphone 430, and a display apparatus 500 having a head-up display 550.

The display apparatus 500 is disposed in the vicinity of the front of the driver seat in the vehicle 200. The display apparatus 500 displays an image relevant to the route guidance of the navigation apparatus 300, on the head-up display 550 to support user's driving. The display apparatus 500 requires less movement of user's visual line compared to the case where the user looks at the navigation apparatus 300 disposed in the center console. This facilitates safe driving.

However, in some cases, it is difficult to post-install the display apparatus 500 in the vehicle 200 already equipped with the navigation apparatus 300. It is because every model for navigation apparatus 300 may not have a terminal for outputting a route guide image. In the case of the navigation apparatus 300 not having any terminal for outputting an image, the navigation apparatus 300 cannot be connected to the display apparatus 500, and cannot transmit any image to the display apparatus 500. Even in the case of the navigation apparatus 300 having the terminal for outputting an image, the head-up display 550 may differ from the navigation apparatus 300 in size or display capability. In this case, the processing for converting an image so as to fit the head-up display 550 is necessary. The conversion processing must be prepared and conducted for each navigation apparatus 300 that has been installed already, which is not always easy.

On the image display system 100, the mobile apparatus 400 acquires the guide sound relevant to the route guidance generated by the navigation apparatus 300, and generates a guide image corresponding to the route guidance based on the recognition result of the guide sound. Then, the display apparatus 500 displays on the head-up display 550 the guide image generated by the mobile apparatus 400. This provides the image corresponding to the route guidance of the navigation apparatus 300, on the head-up display 550 without connection between the navigation apparatus 300 and the display apparatus 500, and further without conducting the processing for converting the image of the navigation apparatus 300. Therefore, it is possible to easily post-install the display apparatus 500 having the head-up display 550, in the vehicle 200 already equipped with the navigation apparatus 300.

4-2. Configuration

Figure 15:
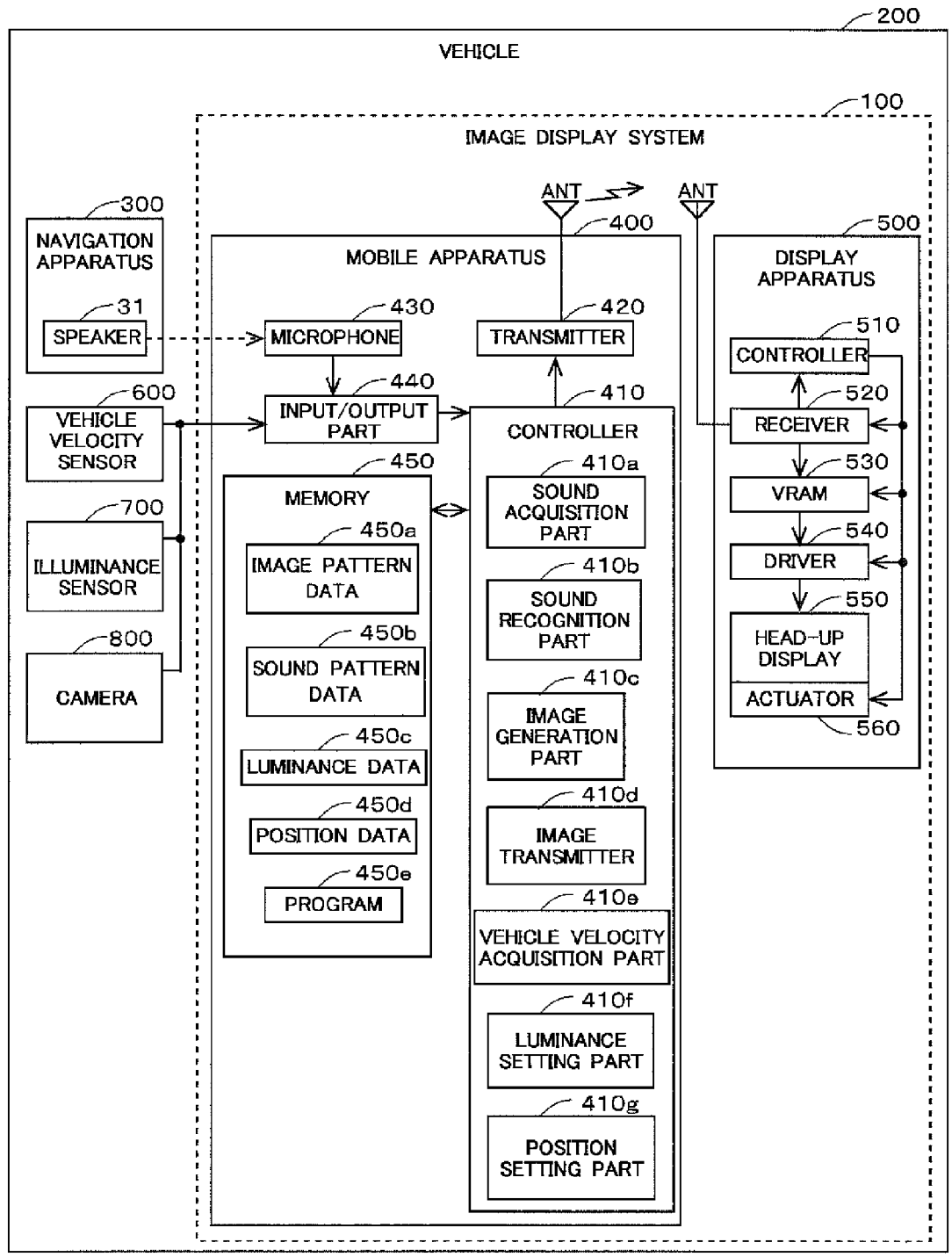
FIG. 15 shows a configuration of the image display system of the third embodiment.

The configuration of the image display system 100 is explained. FIG. 15 shows the configuration of the image display system 100. The image display system 100 includes the mobile apparatus 400 taken into the vehicle 200, and the display apparatus 500.

The mobile apparatus 400 is a mobile electronic device such as a smartphone or a mobile phone. The mobile apparatus 400 includes a controller 410, a transmitter 420, the microphone 430, an input/output part 440 and a memory 450.

The controller 410 is a microcomputer equipped with a CPU, a RAM and a ROM. The controller 410 is connected to other devices included in the mobile apparatus 400, and controls the entire apparatus. Various functions included in the controller 410 are detailed later.

The transmitter 420 is a transmission apparatus that transmits data to the display apparatus 500 wirelessly. The transmitter 420 communicates with the closely-existing display apparatus 500 for information exchange by use of a low-power radio communication function. As the communication function, a wireless LAN technology such as Wi-Fi (Wireless Fidelity) or a short-range radio communication standard such as Bluetooth is used.

The microphone 430 collects the sound output by the navigation apparatus 300. The microphone 430 transmits the collected sound information to the controller 410 via the input/output part 440. It is recommended to adopt a unidirectional microphone whose sensitivity is designed so as not to collect road noises or the like unnecessarily.

The input/output part 440 performs A/D conversion of obtained data, and outputs the converted data to the controller 410.

The memory 450 is a storage medium that stores data. The memory 450 is a nonvolatile memory, such as EEPROM (Electrical Erasable Programmable Read-Only Memory), flash memory, or hard disk drive equipped with a magnetic disc. The memory 450 stores image pattern data 450*a*, sound pattern data 450*b*, luminance data 450*c*, position data 450*d* and a program 450*e*.

The image pattern data 450*a* includes the image data of guide images relevant to the route guidance to be displayed on the head-up display 550. In the image pattern data 450*a*, various types of image data for all of the keywords in the route guidance generated by the navigation apparatus 300 are registered. A keyword is relevant to a remaining distance to a guiding spot, a direction for route guidance or a guiding spot.

Figure 16:
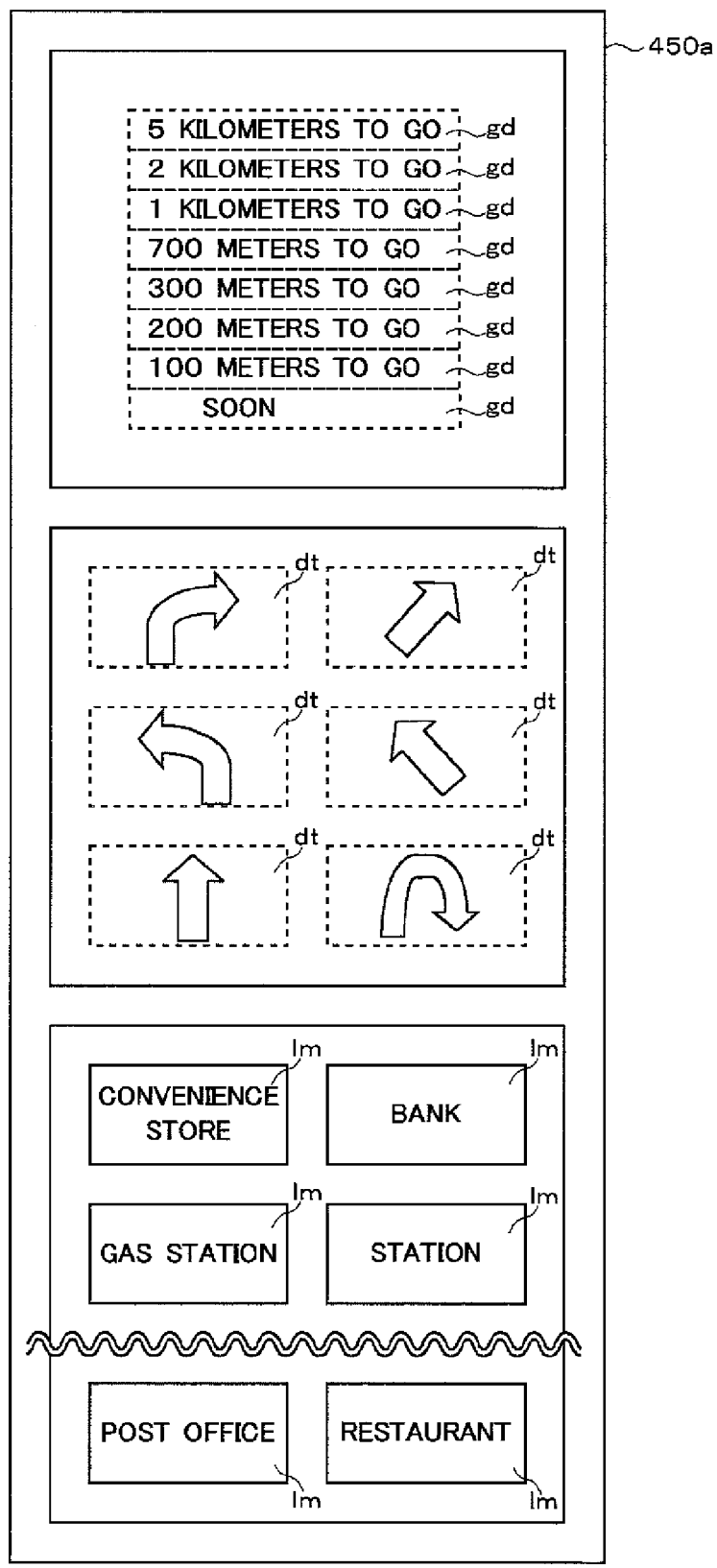
FIG. 16 shows examples of image pattern data.

FIG. 16 shows the examples of the image pattern data 450*a*. In the image pattern data 450*a*, various pieces of image data are registered, for example, distance images gd each of which shows a remaining distance to a guiding spot, direction images dt each of which shows a guide direction by use of an arrow, and spot images lm each of which shows a guiding spot. The distance image gd is an image that includes a number, for example, "5 kilometers to go" or "300 meters to go." The direction image dt is an arrow image, for example, a bending arrow or a U-shaped arrow. The spot image lm is a letter image, for example, "convenience store" or "gas station."

The sound pattern data 450*b* is explained by referring to FIG. 15. In the sound pattern data 450*b*, every keyword of the sound generated for route guidance by the navigation apparatus 300 is associated with a signal waveform and registered as a stereotyped sound. Here is an example case where the navigation apparatus 300 generates the sound, "300 meters ahead, turn right. Landmark is a convenience store." The words "300 meters ahead," "turn right," and "convenience store" correspond to the keywords. As above, the keywords of the sound generated by the navigation apparatus 300 are major words for notification to a user in the route guidance.

Figure 17:
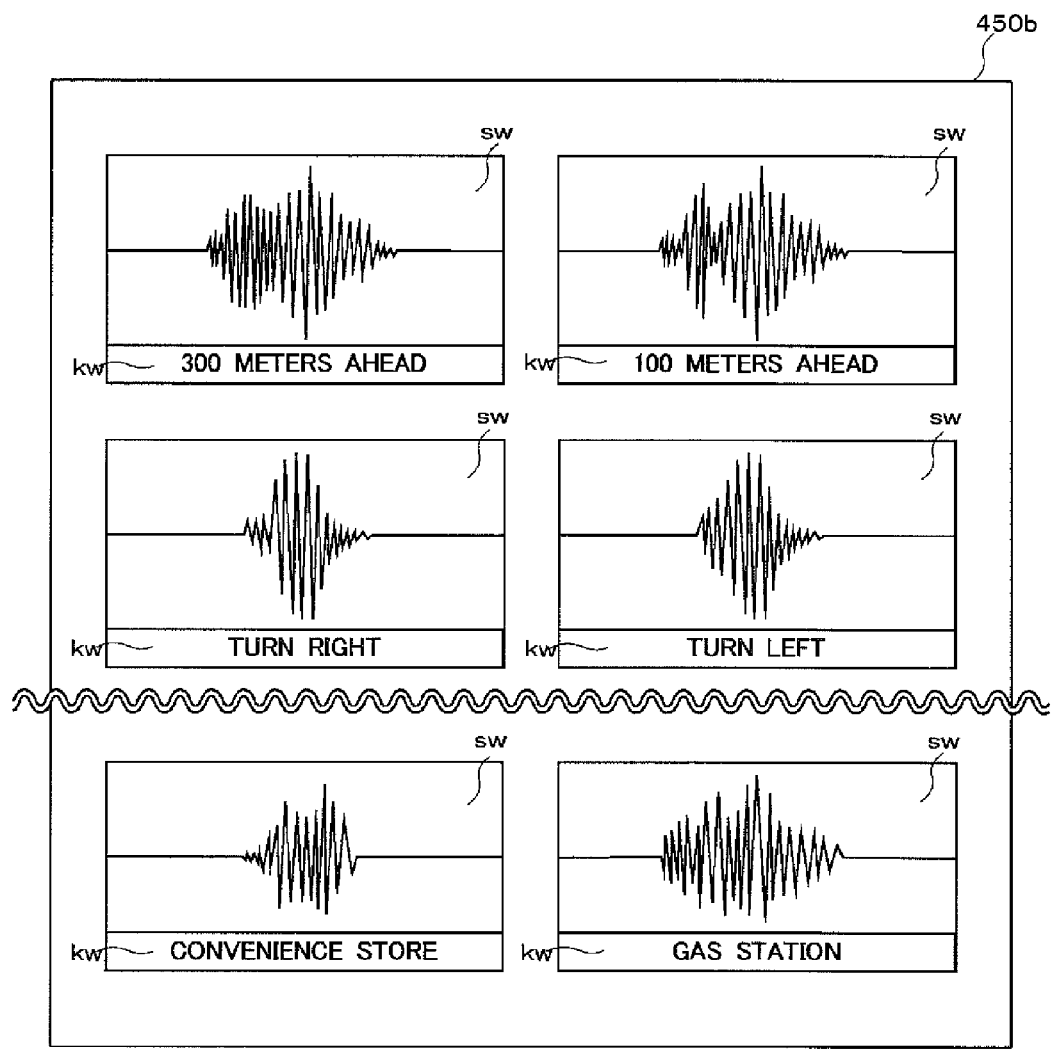
FIG. 17 shows examples of sound pattern data.

FIG. 17 shows the examples of the sound pattern data 450*b*. In the sound pattern data 450*b*, a keyword kw of the sound generated by the navigation apparatus 300 is associated with its signal waveform sw. All the keywords kw of the sound generated by the navigation apparatus 300 and all their signal waveforms sw are registered in the sound pattern data 450*b*. However, various models of the navigation apparatus 300 manufactured by various makers generally differ in the sound contents for route guidance. Therefore, the keywords kw of the sound generated by the navigation apparatus 300 installed in the vehicle 200 and their signal waveforms sw are stored in the memory 450 in advance.

The luminance data 450*c* is explained by referring to FIG. 15. The luminance data 450*c* is a data table where an illuminance around the vehicle 200 is associated with a luminance of the head-up display 550. It is possible to derive the easiest-to-see luminance of the head-up display 550 for the user based on the illuminance around the vehicle 200 and the luminance data 450*c*.

The position data 450*d* is a data table where a position of user's eyes (e.g., a height of eyes and a distance from the head-up display 550) is associated with a position of the head-up display 550 (e.g., angle of the display screen to the user). It is possible to drive the easiest-to-see height of the head-up display 550 for the user based on the position of user's eyes and the position data 450*d*.

The program 450*e* is a firmware that the controller 410 reads out and executes so as to control the display apparatus 500.

The various functions included in the controller 410 described above are explained. The controller 410 includes a sound acquisition part 410*a*, a sound recognition part 410*b*, an image generation part 410c, an image transmitter 410d, a vehicle velocity acquisition part 410e, a luminance setting part 410f, and a position setting part 410g.

The sound acquisition part 410a acquires the sound in the vehicle 200 collected by the microphone 430. Here, the sound acquisition part 410a or the microphone 430, or the sound acquisition part 410a and the microphone 430 functions as the sound acquisition means that acquires the guide sound generated by the navigation apparatus 300.

The sound recognition part 410b understands the contents of the guide sound by distinguishing the signal waveforms of the sound acquired by the sound acquisition part 410a and the signal waveforms of other sound in comparison with the sound pattern data 450b. The sound recognition part 410b functions as the recognition means that understands the guide sound generated by the navigation apparatus 300.

The image generation part 410c reads out an image from the image pattern data 450a, and generates an image relevant to the route guidance for display on the head-up display 550. The image generation part 410c functions as the generation means that generates a guidance image relevant to the route guidance.

The image transmitter 410d transmits the image generated by the image generation part 410c to the display apparatus 500 via the transmitter 420.

The vehicle velocity acquisition part 410e acquires the vehicle velocity data transmitted from a vehicle velocity sensor 600 described later via the input/output part 440. When acquiring the vehicle velocity data, the vehicle velocity acquisition part 410e calculates a velocity of the vehicle 200.

The luminance setting part 410f acquires the illuminance data transmitted from an illuminance sensor 700 described later, via the input/output part 440. The luminance setting part 410f determines the luminance of the head-up display 550 based on the acquired illuminance data and the luminance data 450c stored in the memory 450. The luminance setting part 410f transmits the determined luminance of the head-up display 550 as the luminance information to the display apparatus 500. The luminance information shows brightness of the head-up display 550. When the illuminance around the head-up display 550 is high (that is, it is bright), the luminance setting part 410f transmits the luminance information so as to increase the luminance of the head-up display 550. When the illuminance around the head-up display 550 is low (that is, it is dark), the luminance setting part 410f transmits the luminance information so as to decrease the luminance of the head-up display 550. This enables the user to look at the head-up display 550 under the easy-to-see luminance all the time regardless of brightness or darkness of the surrounding. The luminance setting part 410f functions as a luminance control means.

The position setting part 410g acquires the vehicle cabin image data transmitted from a camera 800 described later via the input/output part 440. The position setting part 410g detects the position of user's eyes (e.g., a height of user's eyes and a distance from the head-up display 550) from the image corresponding to user's face included in the vehicle cabin image data, by use of an existing face recognition algorithm. The face recognition algorithm is to distinguish the parts of a face by extracting distinct features from a face image based on the face features of the shapes of eyes, a nose, cheekbones and a jaw. The algorithm extracts these features and searches an image matched with these features to detect the position of user's eyes. For example, linear discrimination analysis, elastic bunch graph matching, and hidden Markov model correspond to the face recognition algorithm. The position setting part 410g transmits to the display apparatus 500 the position of the head-up display 550 (e.g., angle of the display screen to the user) as position information, based on the acquired position of user's eyes and the position data stored in the memory 450. The position information is, for example, the angle data showing an elevation/depression angle of the head-up display 550. Thereby, the user can look at the head-up display 550 at an easy-to-see position all the time regardless of the position of user's own eyes. The position setting part 410g functions as a position adjusting means.

The configuration of the display apparatus 500 is explained. The display apparatus 500 equipped with the head-up display 550 is disposed in the vicinity of the front of the driver seat. The display apparatus 500 displays on the head-up display 550 the map or the route guidance information acquired from the navigation apparatus 300 to support user's driving. Since the display apparatus 500 is disposed in the vicinity of the front of the user, the display apparatus 500 requires less movement of user's visual line compared to the case where the user looks at the navigation apparatus 300 disposed in the center console. This facilitates safe driving. The display apparatus 500 includes a controller 510, a receiver 520, a VRAM 530, a driver 540, the head-up display 550 and an actuator 560.

The controller 510 is a microcomputer equipped with a CPU, a RAM and a ROM. The controller 510 is connected to other devices included in the display apparatus 500, and thereby controls the entire apparatus.

The receiver 520 is a receiving apparatus that receives the data transmitted by the mobile apparatus 400 wirelessly. The receiver 520 communicates with the closely-existing mobile apparatus 400 for information exchange by use of a low-power radio communication function. As the communication function, a wireless LAN technology such as Wi-Fi (Wireless Fidelity) or a short-range radio communication standard such as Bluetooth is used.

The VRAM 530 is a Video-RAM that temporarily stores image data for generation of the image to be displayed on the head-up display 550.

The driver 540 is a device driver that irradiates projection light showing an image from a projection lens to the head-up display 550 to display the image. As the technology for projecting an image, DLP (Digital Light Processing), LCOS (Liquid Crystal On Silicon) or another system is adopted.

The head-up display 550 is a transparent glass optical element. The irradiation of projection light by the driver 540 makes a letter image, a figure image or the like displayed on the head-up display 550. The image displayed on the head-up display 550 is covered by user's visual field, and formed at an infinite-point. Thus, the user does not have to re-adjust the focus of user's eyes when moving user's own visual point from outside to the image. That is, using the head-up display 550 in the vehicle 200 facilitates safe driving.

The actuator 560 is a driving mechanism that moves the position of the head-up display 550. The actuator 560 that includes a motor moves the head-up display 550 by rotating the motor.

The configuration included in the vehicle 200 is explained. The vehicle 200 includes the navigation apparatus 300, the vehicle velocity sensor 600, the illuminance sensor 700, and the camera 800, in addition to the image display system 100.

The navigation apparatus 300 generates a map image, route guidance information and others, and displays them on a display. The navigation apparatus 300 also outputs sound for the route guidance. The navigation apparatus 300 includes a speaker 310.

The speaker 310 outputs sound, such as voice and signal sound, to inform the user of sound information. The sound output by the speaker 310 is, for example, guide sound relevant to the route guidance.

The vehicle velocity sensor 600 detects the pulse signal generated in proportion to a rotation speed of the axle of the vehicle 200, and transmits the pulse signal as vehicle velocity data to the mobile apparatus 400. The vehicle velocity sensor 600 or the vehicle velocity acquisition part 410e, or the vehicle velocity sensor 600 and the vehicle velocity acquisition part 410e functions as a distance acquisition means.

The illuminance sensor 700 detects an illuminance around the vehicle 200, especially of the background of the head-up display 550. The illuminance sensor 700 that is disposed on the dash board or another location transmits the data on the detected illuminance to the mobile apparatus 400. The illuminance sensor 700 or the luminance setting part 410f, or the illuminance sensor 700 and the luminance setting part 410f functions as an illuminance acquisition means.

The camera 800 is installed in the vehicle cabin of the vehicle 200. The camera 800 disposed on the dash board, in the inner panel or another location shoots user's face. The camera 800 transmits the data on the shot image to the mobile apparatus 400. The camera 800 or the position setting part 410g, or the camera 800 and the position setting part 410g functions as a position acquisition means.

The vehicle velocity sensor 600, the illuminance sensor 700 and the camera 800 may be connected to the mobile apparatus 400 wirelessly or by a connection wire.

4-3. Example of Display Image

Figure 18:
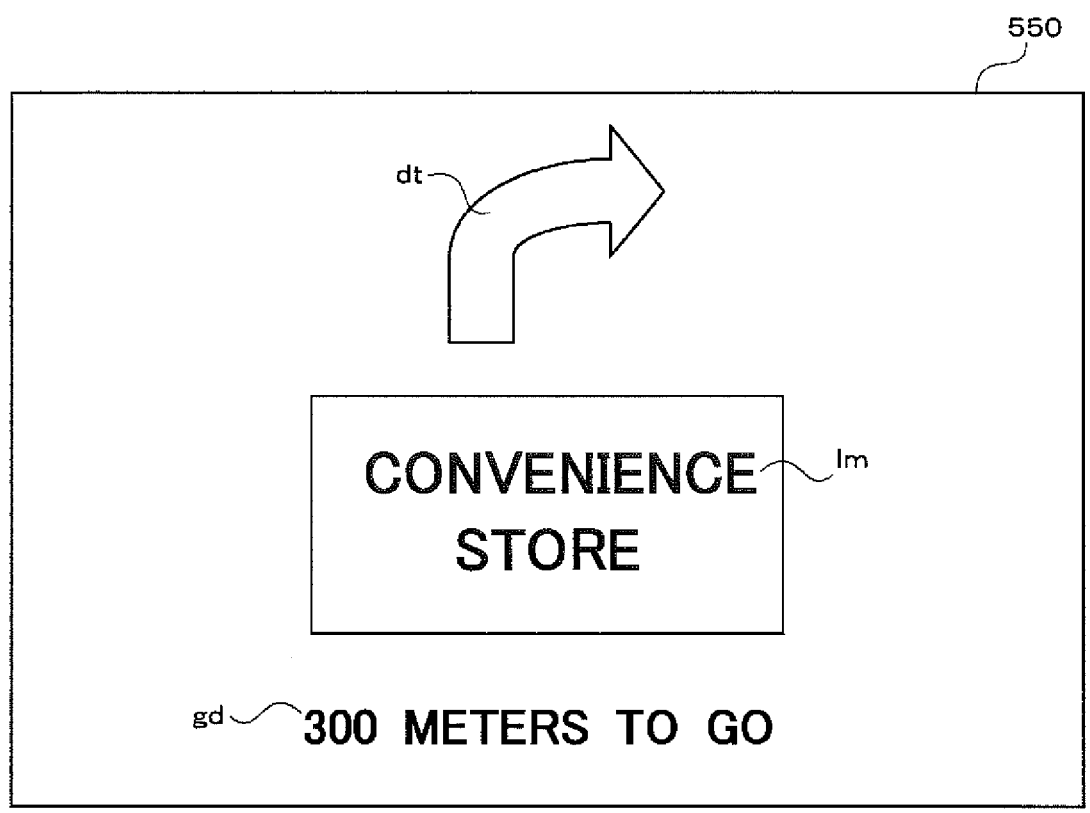
FIG. 18 shows an example image for display on a head-up display.

An example of the image displayed on the head-up display 550 is explained. FIG. 18 shows an example of the image displayed on the head-up display 550 in the case where the navigation apparatus 300 outputs the sound, "300 meters ahead, turn right. Landmark is a convenience store."

A direction image dt showing a guide direction, a spot image 1m showing a guiding spot, and a distance image gd showing a distance to the guiding spot are displayed vertically in one row at the center of the head-up display 550.

It is recommended to display images vertically in a row in a manner where an image having more direct relation with user's driving operation is set upper. It is because a user generally reads from the top to the bottom of the images displayed vertically in a row on the head-up display 550.

4-4. Processing

Figure 19:
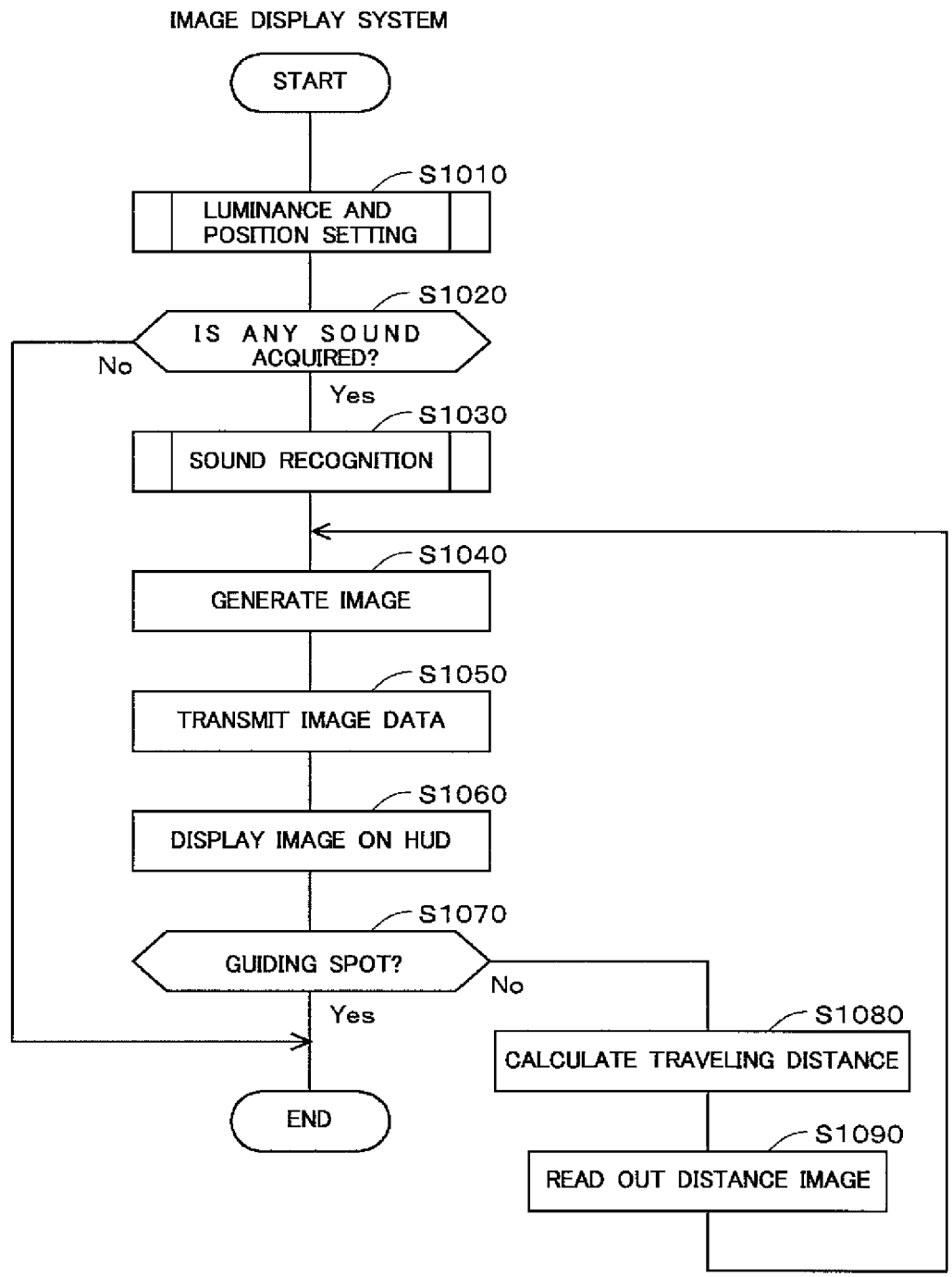
FIG. 19 shows a processing procedure on an image display system of the third embodiment.
Figure 20:
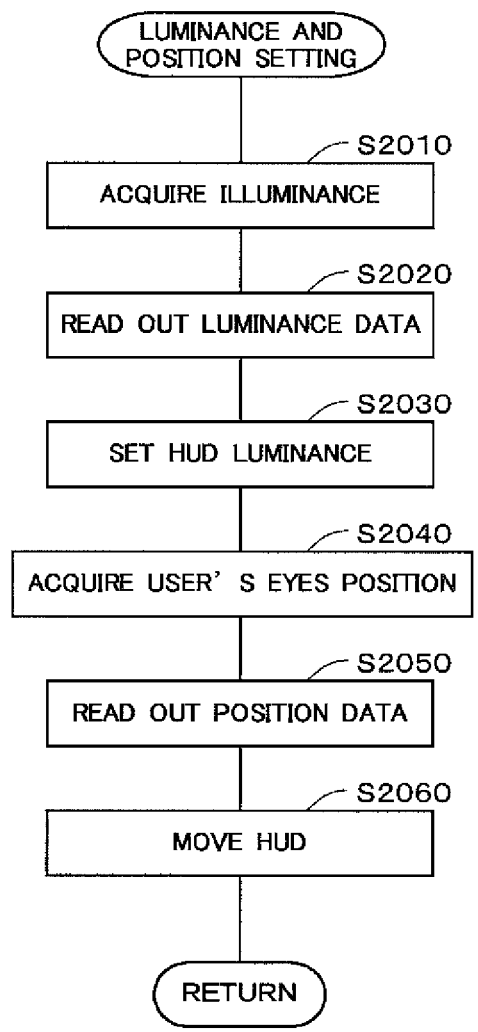
FIG. 20 shows another processing procedure on the image display system of the third embodiment.
Figure 21:
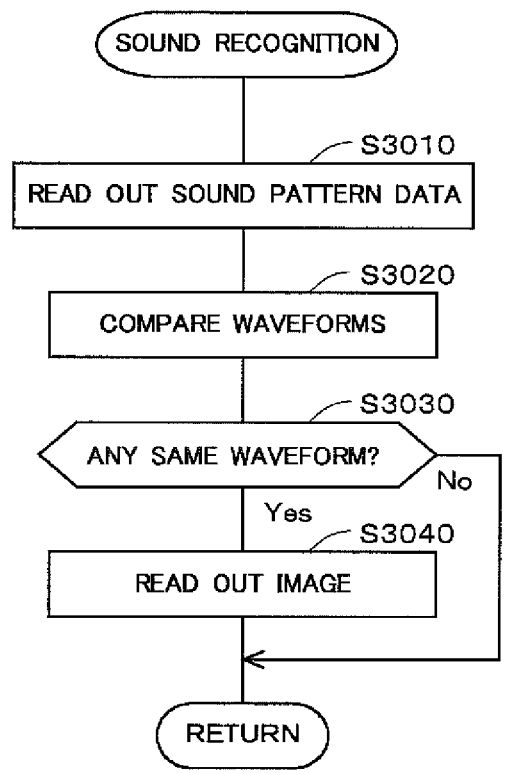
FIG. 21 shows another processing procedure on the image display system of the third embodiment.

The processing procedure on the image display system 100 is explained. Each of FIG. 19, FIG. 20 and FIG. 21 shows the processing procedure on the image display system 100. The processing is executed repeatedly in a prescribed cycle. In FIG. 19 and FIG. 20, the head-up display 550 is referred to as HUD.

FIG. 19 shows the major processing procedure on the image display system 100. First, the luminance setting part 410f and the position setting part 410g respectively set the luminance and the position of the head-up display 550 (step S1010). The processing for setting the luminance and the position of the head-up display 550 is detailed later.

After the execution of the processing for setting the luminance and the position of the head-up display 550, the sound acquisition part 410a determines whether the sound collected by the microphone 430 is acquired (step S1020).

In the case where the sound acquisition part 410a determines that the sound is not acquired (No at the step S1020), the processing is ended. In the case where the sound acquisition part 410a does not acquire any sound, that is, any sound that includes sound from the navigation apparatus 300 is not generated, it is impossible to generate a guide image any more.

In the case where the sound acquisition part 410a determines that the sound is acquired (Yes at the step S1020), the sound recognition part 410b understands the contents of the sound by the method described above (step S1030). The processing for understanding the contents of the sound is detailed later.

When the sound recognition part 410b recognizes the sound, the image generation part 410c reads out the images corresponding to the keywords included in the sound, from the image pattern data 450a in the memory 450. The image read-out from the image pattern data 450a is the direction image dt showing a guide direction by an arrow, the spot image lm showing a guiding spot, or the distance image gd showing a distance to the guiding spot. The image generation part 410c, after reading out the images, generates a display image for the head-up display 550 by setting the images vertically in a row (step S1040).

After the image generation part 410c generates the display image, the image transmitter 410d transmits the generated display image to the display apparatus 500 via the transmitter 420 (step S1050).

When the receiver 520 of the display apparatus 500 receives the generated display image, the image data is stored in the VRAM 530. The controller 510 of the display apparatus 500 drives the driver 540 to display the image data stored in the VRAM 530 on the head-up display 550 (step S1060). Thereby, the user can drive the vehicle 200 safely while looking at the route guide image on the head-up display 550 with less movement of user's own visual line and without re-adjustment of the focus of user's own eyes on the image.

After the image data is displayed on the head-up display 550, the vehicle velocity acquisition part 410e determines whether the vehicle 200 has arrived at the guiding spot (step S1070). The vehicle velocity acquisition part 410e calculates a distance from the vehicle 200 to the guiding spot based on the distance to the guiding spot recognized by the sound recognition part 410b and the vehicle velocity data acquired by the vehicle velocity sensor 600. The vehicle velocity acquisition part 410e determines that the vehicle 200 has arrived at the guiding spot when the calculated distance from the vehicle 200 to the guiding spot is zero.

In the case where the vehicle velocity acquisition part 410e determines that the vehicle 200 has arrived at the guiding spot (Yes at the step S1070), the processing is ended.

In the case where the vehicle velocity acquisition part 410e determines that the vehicle 200 has not yet arrived at the guiding spot (No at the step S1070), the vehicle velocity acquisition part 410e calculates a traveling distance of the vehicle 200 based on the vehicle velocity data acquired from the vehicle velocity sensor 600, and further calculates a remaining distance to the guiding spot (step S1080).

After the vehicle velocity acquisition part 410e calculates the remaining distance to the guiding spot, the image generation part 410c reads out the distance image gd corresponding to the calculated distance from the image pattern data 450a (step S1090).

After reading out the distance image gd, the image generation part 410c again generates another display image to be displayed on the head-up display 550 (step S1040). After the image generation part 410c generates the display image, the steps after the step S1050 described above are executed. Thereby, as the vehicle 200 is approaching the guiding spot, the remaining distance displayed on the head-up display 550 is being gradually reduced. That is, the image generation part 410c, after generating the distance image gd based on the distance from the current location of the vehicle 200 to the guiding spot for route guidance corresponding to the recognition result of the guide sound, temporally and continuously generates the distance image gd showing the distance gradually being reduced in accordance with the traveling distance. This enables the user to drive the vehicle 200 while grasping the distance to the guiding spot all the time. In the case where the user can drive the vehicle 200 while grasping the distance to the guiding spot, the user hardly overlooks the guiding spot, and thus prevents sudden steering or sudden braking due to sudden discovery of the arrival at the guiding spot.

Next explanation is about the detailed processing at the step S1010 where the luminance setting part 410f and the position setting part 410g respectively set the luminance and the position of the head-up display 550. FIG. 20 shows the detailed processing for setting the luminance and the position of the head-up display 550. At the starting of the image display system 100, an authentication processing (so-called pairing) may be executed between the mobile apparatus 400 and the display apparatus 500, and further the step S1010 may be executed in addition.

First, the luminance setting part 410f acquires an illuminance around the vehicle 200 based on the illuminance data transmitted from the illuminance sensor 700 (step S2010).

After acquiring the illuminance, the luminance setting part 410f reads out the luminance data 450c from the memory 450 (step S2020). After reading out the luminance data 450c, the luminance setting part 410f derives the luminance for the head-up display 550 corresponding to the acquired illuminance based on the luminance data 450c.

After deriving the luminance, the luminance setting part 410f transmits the derived luminance data to the display apparatus 500 via the transmitter 420. The controller 510 of the display apparatus 500, after receiving the luminance data, drives the driver 540 to change the luminance of the head-up display 550 so as to correspond to the received luminance (step S2030).

Next, the position setting part 410g acquires the image including user's face transmitted from the camera 800. The position setting part 410g acquires the position of user's eyes by use of the face recognition algorithm described above (step S2040).

The position setting part 410g, after acquiring the position of user's eyes, reads out the position data 450d from the memory 450 (step S2050). The position setting part 410g, after reading out the position data 450d, derives the position of the head-up display 550 corresponding to the acquired position of user's eyes based on the position data 450d.

The position setting part 410g, after deriving the position of the head-up display 550, transmits the derived position data to the display apparatus 500 via the transmitter 420. The controller 510 of the display apparatus 500, after receiving the position data, drives the actuator 560 to move the head-up display 550 so that the position corresponds to the received position (step S2060).

After the controller 510 moves the head-up display 550, the processing goes back to the steps in FIG. 19, and the steps from the step S1020 are executed.

Next explanation is about the detailed processing where the sound recognition part 410b recognizes the sound output by the navigation apparatus 300 at the step S1030. FIG. 21 shows the detailed processing for recognizing the sound output by the navigation apparatus 300.

First, the sound recognition part 410b reads out the sound pattern data 450b from the memory 450 (step S3010).

The sound recognition part 410b determines whether each of the signal waveforms sw in the sound pattern data 450b is included in the signal waveforms in the sound of the navigation apparatus 300 acquired by the sound acquisition part 410a. The sound recognition part 410b compares the signal waveforms of the sound of the navigation apparatus 300 and the signal waveforms sw in the sound pattern data 450b (step S3020), and thereby determining whether the waveforms are different or the same (step S3030). That is, the sound recognition part 410b recognizes the guide sound while distinguishing the guide sound and other sound based on the sound pattern data 450b.

In the case where the sound recognition part 410b determines that some of the signal waveforms sw in the sound pattern data 450b correspond to the signal waveforms of the sound of the navigation apparatus 300 (Yes at the step S3030), the image generation part 410c reads out the image corresponding to the keyword kw of the signal waveform sw from the image pattern data 450a (step S3040). In an example, if the keyword kw is "300 meters ahead," the image generation part 410c reads out the distance image gd corresponding to the letters "300 meters to go." If the keyword kw is "turn left," the image generation part 410c reads out the direction image dt corresponding to "a bending arrow toward a left direction." If the keyword kw is "convenience store," the image generation part 410c reads out the spot image lm corresponding to the letters "convenience store."

In the case where the image generation part 410c reads out an image from the image pattern data 450a, or where the sound recognition part 410b determines that none of the signal waveforms sw in the sound pattern data 450b corresponds to the signal waveforms of the sound of the navigation apparatus 300 (No at the step S3030), the processing goes back to the steps of the processing in FIG. 19 where the image generation part 410c generates the display image to be displayed on the head-up display 550 (step S1040).

As above, on the image display system 100, the mobile apparatus 400 acquires the guide sound relevant to the route guidance generated by the navigation apparatus 300, and generates the guide image relevant to the route guidance based on the recognition result of the guide sound. Then, the display apparatus 500 displays the generated guide image on the head-up display 550. This enables the display on the head-up display 550, of the image matched with the route guidance of the navigation apparatus 300, without connection between the navigation apparatus 300 and the display apparatus 500 and further without the processing for converting the image of the navigation apparatus 300. That is, it is possible to easily post-install the display apparatus 500 equipped with the head-up display 550 in the vehicle 200 already equipped with the navigation apparatus 300.

5. Modification of the Third Embodiment

So far, the third embodiment of the invention has been explained. However, the third embodiment may have various modifications. Hereafter, the modifications are explained. All embodiments including the embodiment described above and the embodiments to be described below can be arbitrarily combined with others.

In the third embodiment, the image display system 100 includes the mobile apparatus 400 and the display apparatus 500. On the image display system, sound is acquired, an image is generated, and then the generated image is displayed on the head-up display 550. In a modification, a display apparatus 500 includes various functions of an image display system 100. In the display apparatus 500, sound is acquired, an image is generated, and then the generated image is displayed on a head-up display 550. That is, the display apparatus 500 includes a controller 410, a transmitter 420, a microphone 430, an input/output part 440, and a memory 450. The modification includes the same configuration and the same processing as the third embodiment. Thus, the display apparatus 500 can acquire the sound of the navigation apparatus 300 and display an image on the head-up display 550 without a mobile apparatus 400.

Figure 22:
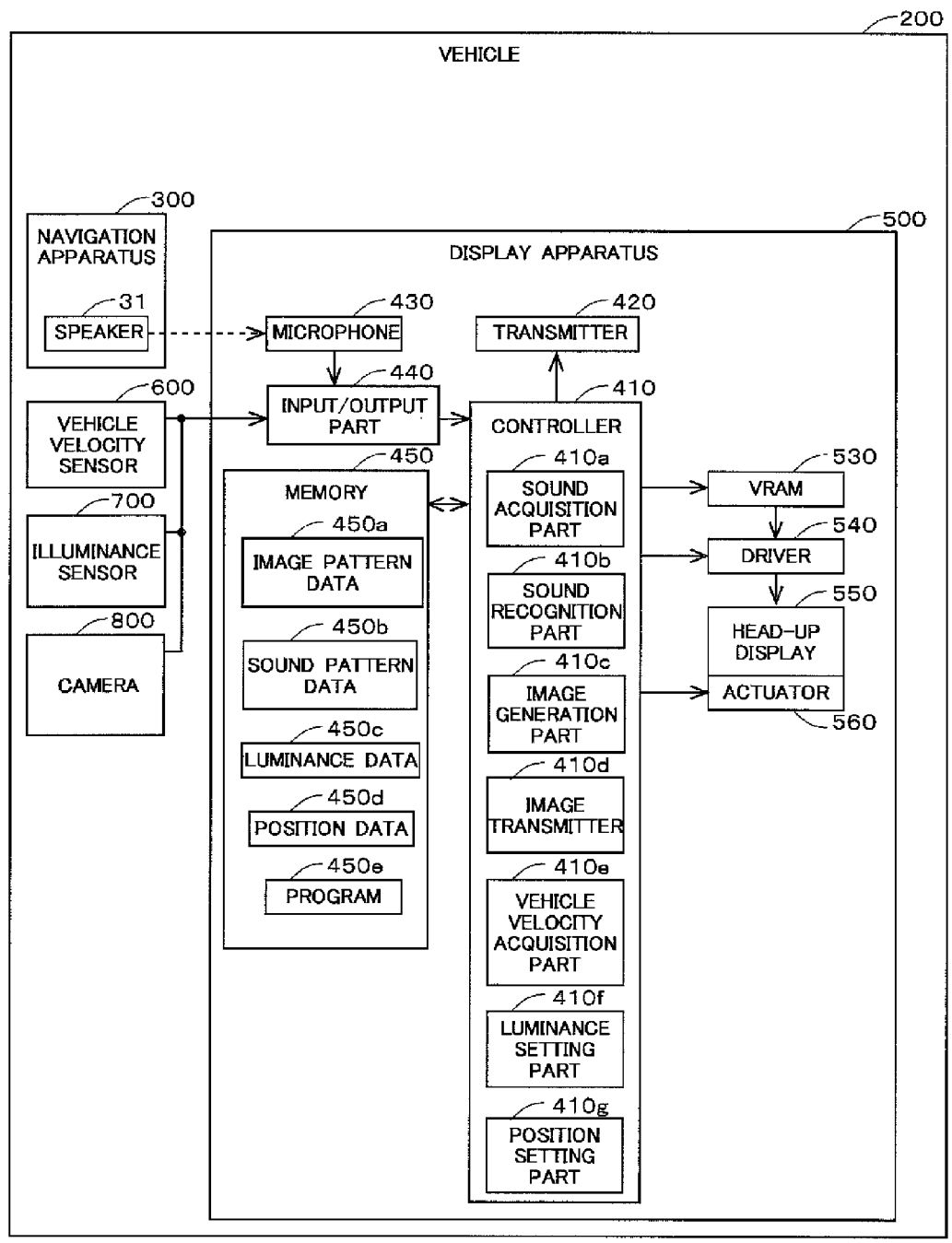
FIG. 22 shows a modification of the image display system.

FIG. 22 shows the configuration of the display apparatus 500 of the modification. The display apparatus 500 includes a part of the functions included in the mobile apparatus 400 of the third embodiment. It is not necessary that the display apparatus 500 includes the transmitter 420 and the receiver 520 of the third embodiment. This is because there is no need to exchange data between the display apparatus 500 and the mobile apparatus 400. The controller 410 of the display apparatus 500 controls a VRAM 530, a driver 540 and an actuator 560 that are included in the display apparatus 500 like in the third embodiment.

The processing procedure on the display apparatus 500 of the modification is the same as the processing shown in FIG. 19, FIG. 20 and FIG. 21. In the third embodiment, the mobile apparatus 400 and the display apparatus 500 execute the processing; while in the modification, the display apparatus 500 executes the processing.

Thus, the display apparatus 500 can acquire the sound of the route guidance of the navigation apparatus 300 not via the mobile apparatus 400, and thereby displaying the image corresponding to the route guidance on the head-up display 550. The display apparatus 500 can also set the luminance and the position of the head-up display 550 appropriately not via the mobile apparatus 400. In addition, it is possible to easily post-install the display apparatus 500 equipped with the head-up display 550 in the vehicle 200 already equipped with the navigation apparatus 300, not via the mobile apparatus 400.

Other modifications are explained. In the embodiment described above, the mobile apparatus 400 collects the sound of the navigation apparatus 300 via the microphone 430. The sound may be collected via an audio pre-out of a navigation apparatus 300, or via a speaker line that connects between a navigation apparatus 300 and a speaker 310.

In the embodiment described above, the controller 410 of the mobile apparatus 400 includes the sound recognition part 410*b*. A sound recognition part 410*b* may be included in the information center established outside a vehicle 200. In this case, a mobile apparatus 400 may exchange sound data and sound recognition result with the information center via a transmitter 420. Or, an information center may include an image generation part 410*c*, and may generate an image for display on a head-up display 550.

In the embodiment described above, the mobile apparatus 400 includes the image pattern data 450*a* and the image generation part 410*c* of the controller 410. A display apparatus 500 may include an image generation part 410*c* and image pattern data 450*a*. In accordance with the recognition result of a sound recognition part 410*b* of a mobile apparatus 400, the mobile apparatus 400 may direct the display apparatus 500 to generate and display an image based on the image pattern data 450*a*. The display apparatus 500 may display letters and images on a head-up display 550 by a segment system. In this case, the mobile apparatus 400 may direct the display apparatus 500 to light on or off for each segment based on sound recognition results.

In the embodiments described above, the sound recognition part 410*b* distinguishes the sound of the route guidance and other sound by use of the sound pattern data 450*b*. In a vehicle 200 equipped with an audio device, a sound recognition part 410*b* may detect the mute signal (signal for silencing audio sound temporarily when providing route guidance by sound) output by the audio device, and thereby distinguishing the sound of the audio device and the sound for route guidance. Or, a sound recognition part 410*b* may distinguish the sound of the audio device and the sound for route guidance by recognizing difference between the sound output through the right speaker and the sound output through the left speaker, of the audio device installed in a vehicle 200.

In the embodiment described above, data are exchanged wirelessly between the transmitter 420 of the mobile apparatus 400 and the receiver 520 of the display apparatus 500. However, data may be exchanged through communication by wire. In this case, a transmitter 420 and a receiver 520 may be connected by use of USB (Universal Serial Bus) or the like.

A vehicle velocity or time may be displayed on a head-up display 550. Any information may be displayed as long as it serves driving. However, the information must be of a number, a symbol, or simple letters. It is because, on the head-up display 550 having constraints on a setting position and resolution, it is difficult to display complicated information. It is also because the essential purpose of the head-up display 550 is to provide simple information promptly to a user.

In the embodiment described above, the distance to a guiding spot is calculated based on the vehicle velocity data. However, a vehicle 200 or a mobile apparatus 400 may include a satellite-utilized positioning device by use of GPS (Global Positioning System) or the like. The satellite-utilized positioning device may calculate the distance to the guiding spot. The satellite-utilized positioning device may be included in a display apparatus 500.

In the embodiment described above, the spot image lm of the image pattern data 450*a* indicates letters. For example, "Bank" is indicated. However, a spot image lm may show a pictogram or a symbol such as "¥," not letters.

Figure 23:
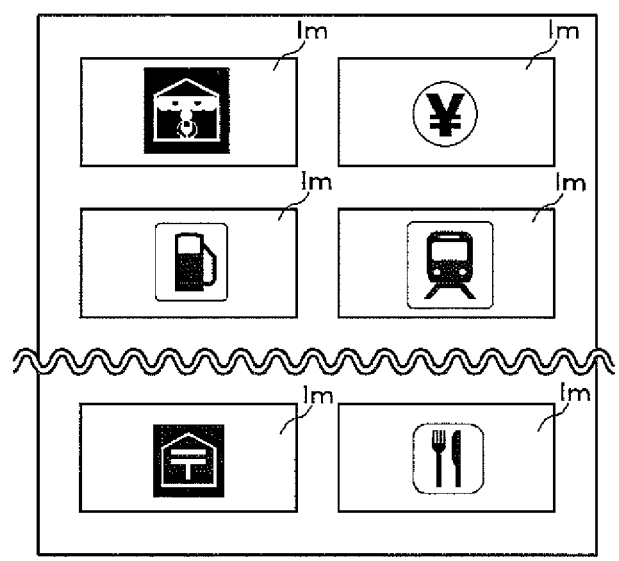
FIG. 23 shows other examples of the image pattern data.

FIG. 23 shows example spot images lm showing symbols and pictograms. A user can intuitively discriminate a symbol or a pictogram without reading letters of a spot image lm. This can drastically reduce the time required for reading the images on the head-up display 550 by the user. As a result, the user can concentrate his/her attention on a forward visual field, which facilitates safe driving.

In the explanation above, the display apparatus 500 is installed in a vehicle. The vehicle here includes a two-wheel vehicle, a train, an airplane and a ship, as well as an automobile. In addition, the vehicle includes the ones for military use and commercial use, and also private use and business use. A display apparatus 500 may be installed in a house, a building or the like, not only in a vehicle.

In the explanation above, the display apparatus 500 is installed in a vehicle. However, a display apparatus 500 may be a part of a so-called wearable computer. In this case, a head-up display 550 may be a head-mounted display that displays video on a transparent plate of glasses, or a helmet-type display that displays video on a helmet visor.

In the explanation above, brightness around the vehicle 200 is measured by the illuminance sensor 700. However, brightness may be estimated based on the detection of the lighting switch being on or off included in a vehicle 200. Or, brightness may be estimated based on time on the clock built in an image display system 100.

In the explanation above, the camera 800 is installed in the vehicle cabin of the vehicle 200. However, it is not necessary that the camera 800 is installed in the vehicle cabin of the vehicle 200. A camera 800 may be a portable camera, or a camera that functions as a part of another device, such as a mobile phone with camera. In this case, without the installation of the camera 800 in the vehicle cabin of a vehicle 200, another user sitting on a front passenger seat or another seat holds the camera 800 so as to make the optical axis of the camera 800 point user's face. Or, a portable camera may measure an illuminance around the vehicle 200.

While the invention has been shown and described in detail, the foregoing description is in all aspects illustrative and not restrictive. It is therefore understood that numerous other modifications and variations can be devised without departing from the scope of the invention.

What is claimed is:

1. An on-vehicle display apparatus for use in a vehicle, the on-vehicle display apparatus comprising:
   a controller configured to:
   (i) acquire a first display image to be displayed on a display screen of a navigation apparatus;
   (ii) extract a portion of the first display image as an extraction image based on pre-stored layout information of a layout of the first display image, the pre-stored layout information indicating which portion of the first display image to extract, the portion to extract being chosen from among a plurality of pre-stored portions corresponding to different portions of the first display image; and
   (iii) generate a second display image by use of the extraction image; and
   a head-up display that displays the second display image generated by the controller.

2. The on-vehicle display apparatus of claim 1, wherein the controller further:
   (iv) acquires a vehicle information representing a status of the vehicle, and wherein the controller generates the second display image based on the vehicle information.

3. The on-vehicle display apparatus of claim 2, wherein the vehicle information is a velocity information of the vehicle, and
   the controller generates the second display image so as to have more quantity of information as the vehicle travels at a lower velocity.

4. The on-vehicle display apparatus of claim 2, wherein the vehicle information is an illumination signal representing a status of a lighting apparatus of the vehicle, and
   the controller generates the second display image for daytime viewing or nighttime viewing in accordance with the illumination signal.

5. The on-vehicle display apparatus of claim 1, wherein the controller further:
   (iv) determines whether or not the first display image is a moving picture, and wherein
   the controller controls the head-up display so that the head-up display does not display the second display image in a case where the first display image is the moving picture.

6. The on-vehicle display apparatus of claim 1, wherein the controller acquires the first display image by shooting of the display screen of the navigation apparatus with a camera.

7. The on-vehicle display apparatus of claim 1, wherein the controller further:
   (iv) acquires a sound output by the navigation apparatus, and wherein,
   the controller determines a region to be extracted from the first display image as the extraction image, based on the layout information and the acquired sound.

8. The on-vehicle display apparatus of claim 1, wherein the controller further:
   (iv) acquires the layout information from an information center storing the layout information.

9. A display method for use in a vehicle, the display method comprising the steps of:
   acquiring, with a controller, a first display image to be displayed on a display screen of a navigation apparatus;
   extracting, with the controller, a portion of the first display image as an extraction image based on pre-stored layout information of a layout of the first display image, the pre-stored layout information indicating which portion of the first display image to extract, the portion to extract being chosen from among a plurality of pre-stored portions corresponding to different portions of the first display image;
   generating, with the controller, a second display image by use of the extraction image; and
   displaying the second display image generated by the controller on a head-up display.

10. An image display system for use in a vehicle, the image display system comprising:
    a controller configured to:
    (i) acquire a guide sound relevant to a route guidance generated by a navigation apparatus;
    (ii) recognize the guide sound; and
    (iii) generate a guide image relevant to the route guidance based on a recognition result of the recognized guide sound, the guide image being a pre-stored image corresponding to the recognized guide sound based on pre-stored correspondence data indicating correspondence between a plurality of guide sounds and a plurality of guide images; and
    a head-up display that displays the guide image generated by the controller.

11. The image display system of claim 10, further comprising:
    a memory that stores the guide sound in advance as a stereotyped sound; and
    a microphone that receives the guide sound and provides a sound signal to the controller as the acquired guide sound, wherein
    the controller recognizes the guide sound while distinguishing the guide sound and another sound based on the stereotyped sound.

12. The image display system of claim 10, wherein the controller further:
    (iv) acquires a traveling distance of the vehicle, and wherein
    the controller generates the guide image including a distance from a current location of the vehicle to a spot to which the route guidance is performed, the distance being indicated by the recognition result of the guide sound, and then temporally and continuously generates a plurality of the guide images that are gradually reduced from the distance in accordance with the traveling distance.

13. The image display system of claim 10, wherein the controller further:
    (iv) acquires an illuminance outside the vehicle; and
    the controller controls a luminance of the guide image to be displayed by the head-up display based on the illuminance.

14. The image display system of claim 10, wherein the controller further:

(iv) acquires a position of a user's eyes; and the controller controls a position of the head-up display based on the position of the user's eyes.

15. A head-up display apparatus for use in a vehicle, the head-up display apparatus comprising:

a controller configured to:

(i) acquire a guide sound relevant to a route guidance generated by a navigation apparatus that is set externally;

(ii) recognize a content of the guide sound; and (iii) generate a guide image relevant to the route guidance based on a recognition result of the recognized content of the guide sound, the guide image being a pre-stored image corresponding to the recognized content of the guide sound based on pre-stored correspondence data indicating correspondence between a plurality of guide sounds and a plurality of guide images; and a display part that displays the guide image generated by the controller.

16. An image display method for use in a vehicle, the image display method comprising the steps of:

acquiring, with a controller, a guide sound relevant to a route guidance generated by a navigation apparatus;

recognizing, with the controller, the guide sound;

generating, with the controller, a guide image relevant to the route guidance based on a recognition result of the recognized guide sound, the guide image being a pre-stored image corresponding to the recognized guide sound based on pre-stored correspondence data indicating correspondence between a plurality of guide sounds and a plurality of guide images; and displaying the guide image generated by the controller on a head-up display.

17. A non-transitory computer-readable recording medium that stores a program to be executed by a computer for use in a vehicle, the program making the computer execute the steps of:

acquiring a guide sound relevant to a route guidance generated by a navigation apparatus;

recognizing the guide sound;

generating a guide image relevant to the route guidance based on a recognition result of the recognized guide sound, the guide image being a pre-stored image corresponding to the recognized guide sound based on pre-stored correspondence data indicating correspondence between a plurality of guide sounds and a plurality of guide images; and displaying the guide image on a head-up display by outputting the guide image.

* * * * *